(12) United States Patent
Kawakami et al.

(10) Patent No.: US 8,538,565 B2
(45) Date of Patent: Sep. 17, 2013

(54) MUSIC PLAYING APPARATUS, MUSIC PLAYING METHOD, RECORDING MEDIUM STORING MUSIC PLAYING PROGRAM, AND INTEGRATED CIRCUIT THAT IMPLEMENT GAPLESS PLAY

(75) Inventors: Takahiro Kawakami, Hiroshima (JP); Masaaki Morioka, Hiroshima (JP); Junichi Nakahashi, Nara (JP); Yukihiko Kimura, Kyoto (JP)

(73) Assignee: Panasonic Corporation, Osaka (JP)

( * ) Notice: Subject to any disclaimer, the term of this patent is extended or adjusted under 35 U.S.C. 154(b) by 1002 days.

(21) Appl. No.: 12/596,715

(22) PCT Filed: Feb. 19, 2009

(86) PCT No.: PCT/JP2009/000709
§ 371 (c)(1),
(2), (4) Date: Oct. 20, 2009

(87) PCT Pub. No.: WO2009/104402
PCT Pub. Date: Aug. 27, 2009

(65) Prior Publication Data
US 2010/0208901 A1  Aug. 19, 2010

(30) Foreign Application Priority Data
Feb. 22, 2008 (JP) .................................. 2008-042007

(51) Int. Cl.
*G06F 17/00* (2006.01)
(52) U.S. Cl.
USPC .......................................................... 700/94
(58) Field of Classification Search
USPC .......................................................... 700/94
See application file for complete search history.

(56) References Cited

U.S. PATENT DOCUMENTS

2007/0169613 A1 * 7/2007 Kim et al. ........................ 84/609
2008/0049947 A1   2/2008 Yoneda et al.

FOREIGN PATENT DOCUMENTS

| JP | 2003-45123 | 2/2003 |
| JP | 2007-179604 | 7/2007 |
| JP | 2008-20863 | 1/2008 |

OTHER PUBLICATIONS

English language Abstract of JP 2007-179604, Jul. 12, 2007.
English language Abstract of JP 2008-20863, Jan. 31, 2008.
English language Abstract of JP 2003-45123, Feb. 14, 2003.

* cited by examiner

*Primary Examiner* — Joseph Saunders, Jr.
(74) *Attorney, Agent, or Firm* — Greenblum & Bernstein, P.L.C.

(57) ABSTRACT

A music playing apparatus includes: a sound and silence determining unit determining whether or not each frame included in first and second output PCM data is a sound frame including a sample having an output level not lower than a predetermined threshold; a connection point extracting unit extracting a candidate connection point being a sample having a largest variation in a lean of a PCM waveform, from each of the determined sound frames; an end detecting unit detecting candidate connection points included in a last sound frame of the first output PCM data and an initial sound frame of the second output PCM data, respectively, as a first connection point and a second connection point; and a tune continuously-output unit connecting the first output PCM data to the second output PCM data at the first and the second connection points, and playing the connected data.

9 Claims, 13 Drawing Sheets

FIG. 3A

| Frame number | 1 | 2 | 3 | ... | N-2 | N-1 | N |
|---|---|---|---|---|---|---|---|
| Frame state | Silence | Sound | Sound | ... | Silence | Sound | Silence |
| Sound starting position | 0 | 235 | 0 | ... | 0 | 847 | 0 |
| Silence starting position | 0 | 1023 | 223 | ... | 988 | 563 | 0 |

FIG. 3B

| Frame number | 1 | 2 | 3 | ... | N-2 | N-1 | N |
|---|---|---|---|---|---|---|---|
| Frame state | Silence | Sound | Sound | ... | Silence | Sound | Silence |
| Sound starting position | 0 | 296 | 0 | ... | 0 | 847 | 0 |
| Silence starting position | 0 | 1023 | 223 | ... | 938 | 164 | 0 |

FIG. 3C

| Frame number | 1 | 2 | 3 | ... | N-2 | N-1 | N |
|---|---|---|---|---|---|---|---|
| Frame state | Invalid | Rising | Risen | ... | To be dropped | Dropping | Invalid |
| Sound starting position | 0 | 296 | 0 | ... | 0 | 847 | 0 |
| Silence starting position | 0 | 1023 | 223 | ... | 938 | 164 | 0 |

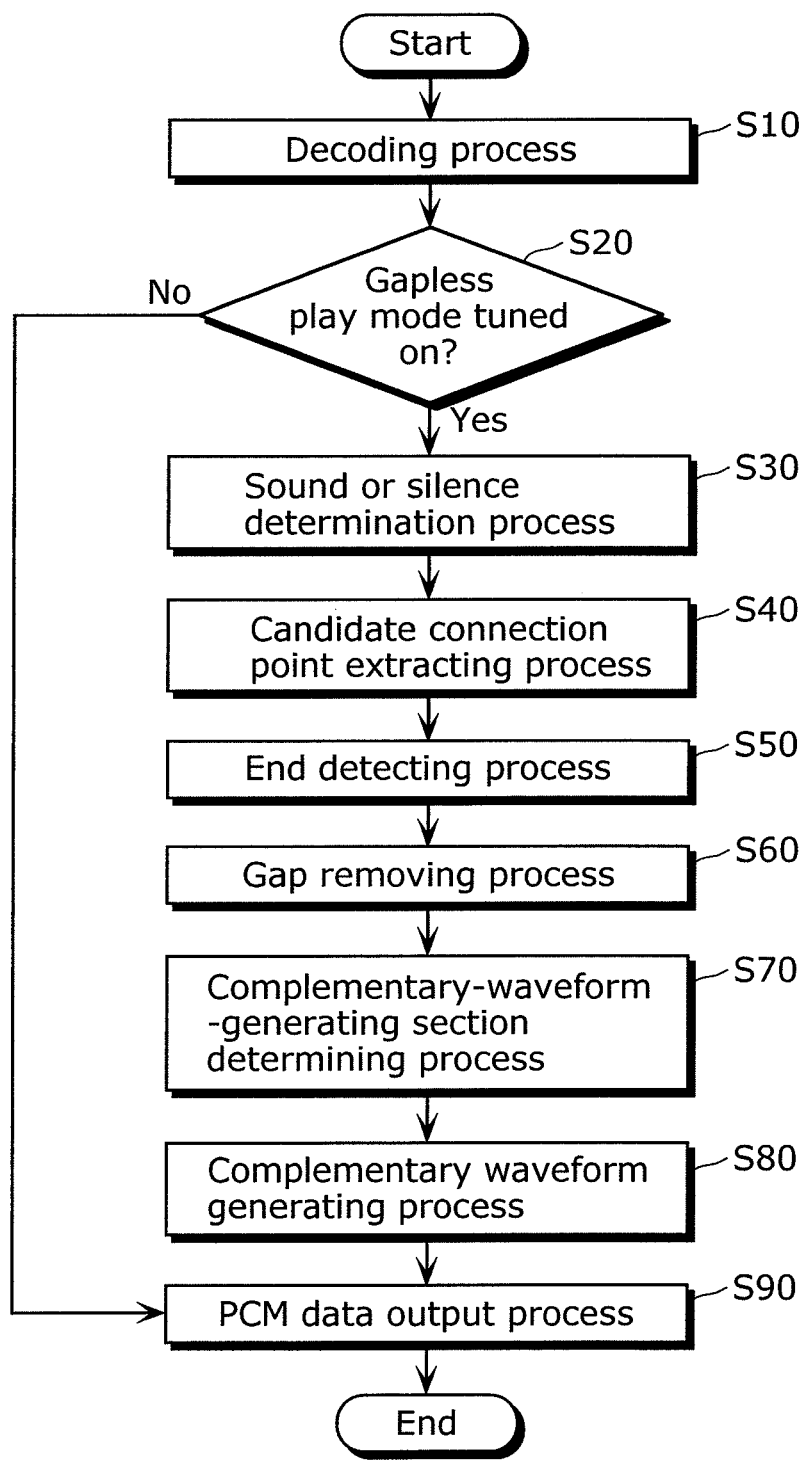

MUSIC PLAYING APPARATUS, MUSIC PLAYING METHOD, RECORDING MEDIUM STORING MUSIC PLAYING PROGRAM, AND INTEGRATED CIRCUIT THAT IMPLEMENT GAPLESS PLAY

TECHNICAL FIELD

The present invention relates to a music playing apparatus and a play control method, and a music playing program and an integrated circuit which implement the music playing apparatus and the play control method, and in particularly to a music playing apparatus, a play control method, a music playing program, and an integrated circuit, for continuously playing a plurality of tune data obtained by dividing a sound source into portions and respectively coding and decoding the portions.

BACKGROUND ART

In recent years, music playing apparatuses that play a large amount of tune data recorded onto internal and external non-volatile memories and miniature magnetic-storage devices have been on the market. The music playing apparatuses include portable players, mini-component stereo systems, and car audio systems. In general, these music playing apparatuses use audio coding techniques for compressing data while audio quality of sound sources practically remain unchanged in order to store the large amount of tune data in each limited storage area or improve transportability of tune data.

Furthermore, lossy compression methods are generally used for compression in the audio coding techniques, such as MPEG Audio Layer3 (MP3), Windows (trademark) Media Audio (WMA), and Advanced Audio Coding (AAC). Here, each of the sound sources is equivalent to data in a Pulse Code Modulation (PCM) format.

However, in the audio coding techniques, silent portions and transition portions (waveforms connected between sound source portions and silent portions) that are not included in the sound source as the characteristics of coding algorithms are added to one of a front end and a terminal end of each tune data or to both ends of each tune data during a process of coding (coding data in the PCM format, using the audio coding techniques) and decoding (decoding coded data into data in the PCM format to be played). A combination of the silent portion and the transition portion is referred to as a gap hereinafter. Furthermore, the vicinity of waveforms corresponding to front ends and terminal ends of each tune data have distortions. The distortions in the waveforms become more apparent, as absolute values of the front ends and the terminal ends of each tune data are larger. For example, sound sources of live music, classical music, eurobeat, and other genres of music have long duration, and are recorded onto recording media, such as CDs by dividing each of the sound sources into tracks. Thus, when the tracks are read from each of the CDs, and respectively coded and decoded to play the tracks in the same order as the original CDs, there is a problem that tracks between a plurality of tune data are added with gaps and have waveform distortions, and a user who listens to the music hears these gaps and waveform distortions as noise. Here, the gaps and waveform distortions are not included in the sound sources.

Thus, a music playing apparatus that enables "gapless play" has been desired. The gapless play is performed by dividing a sound source into portions, coding and decoding the portions respectively using the audio coding techniques, and continuously playing the decoded portions without having any uncomfortable feeling as solely playing the sound source.

The conventional technique of gapless play will be described with reference to FIG. 1. A track (N) 101 and a track (N+1) 102 are successive on a CD, and are obtained by dividing a sound source having no interval in between into tracks. Here, when the track (N) 101 and the track (N+1) 102 are respectively coded and decoded, each end of tune data is added with a gap 103 and has a waveform distortion 104. Thus, when a plurality of the decoded tune data are simply connected and the resultant data is played, the tune data has intervals that are not included in the sound source, and the user hears the intervals as noise with sound interruption and prolonged sound. Patent Reference 1 discloses a technique for removing silent portions by determining the continuity of tracks, as a method for solving this problem.

Patent Reference 1: Japanese Unexamined Patent Application Publication No. 2007-179604

DISCLOSURE OF INVENTION

Problems that Invention is to Solve

However, the conventional technique can be used for removing the silent portions but cannot be used either for removing the transition portions or for dealing with the waveform distortions 104. Thus, the gaps 103 that are unnecessary for implementing the gapless play cannot be entirely removed, and thus the sound interruption and prolonged sound will remain.

Furthermore, since the waveform distortions 104 remain unchanged, there is a problem that noise between tracks cannot be eliminated.

The present invention is to solve the conventional problems, and has an object of providing (i) a music playing apparatus and a music playing method that implement the gapless play in which noise felt by the user is minimized by removing a transition portion that is a remaining gap and dealing with the waveform distortions 104, and (ii) a music playing program and an integrated circuit for implementing the music playing apparatus and the music playing method.

Means to Solve the Problems

The music playing apparatus according to the present invention is a music playing apparatus that obtains and plays first output Pulse Code Modulation (PCM) data and second output PCM data generated, respectively, by dividing a sound source into portions, and coding and decoding each of the portions, the sound source being in a PCM format, wherein each of both ends of the first output PCM data and the second output PCM data includes: (i) a silent portion that is a section having an output level lower than a predetermined threshold; and (ii) a transition portion that connects a portion corresponding to an end of a corresponding one of the portions of the divided sound source to the silent portion, and the music playing apparatus includes: a sound and silence determining unit configured to determine whether or not each of frames respectively included in the first output PCM data and the second output PCM data is a sound frame including a sample having the output level not lower than the predetermined threshold; a connection point extracting unit configured to extract a candidate connection point from each of one or more of the sound frames determined by the sound and silence determining unit, the candidate connection point being a sample having a largest variation in a lean of a waveform in the PCM format; an end detecting unit configured to detect, as a first connection point, a corresponding one of the candidate connection points included in a last sound frame of the first output PCM data, and to detect, as a second connection point, a corresponding one of the candidate connection points included in an initial sound frame of the second output PCM data, the last sound frame and the initial sound frame being included in the sound frames; and a tune continuously-output unit configured to connect the first output PCM data to the second output PCM data at the first connection point and the second connection point, and to play the connected data.

The music playing apparatus can remove the transition portion as well as the silent portion by extracting a high frequency component that is a point having a largest variation in a lean of a waveform in the PCM format and that has a distinctive feature and appears in a boundary between the transition portion and an end of the divided sound source. Thus, the sound interruption and prolonged sound can be eliminated.

Furthermore, each of the first output PCM data and the second output PCM data has a waveform distortion, in a waveform of each of sections corresponding to the ends of the portions of the divided sound source, due to the dividing, coding, and decoding of the sound source, and the music playing apparatus may further include a complementary waveform generating unit configured to replace the waveforms in the sections each having the waveform distortion, respectively with complementary waveforms each of which is a cubic curve and has a larger lean as approaching closer to a center of a corresponding one of the sections.

In this manner, the music playing apparatus further includes the complementary waveform generating unit that replaces the waveform distortions respectively with the complementary waveforms that are alternative waveforms for suppressing noise. Thus, when a tune is continuously played, a terminal end of the first output PCM data can be smoothly connected to a front end of the second output PCM data, thus enabling considerable reduction in noise between the first output PCM data and the second output PCM data.

Furthermore, the complementary waveform generating unit previously holds a value of a time T longer than a duration of each of the sections having the waveform distortions, and may be configured to: extract a sample in the first output PCM data as a complementary-waveform generation starting point, the sample (i) being subsequent to a sample earlier than the first connection point by a time 2T, (ii) being prior to a sample earlier than the first connection point by a time T, and (iii) having a smallest lean of a waveform in the PCM format; extract the first connection point as a complementary-waveform generation end point; and replace each of the sections between the complementary-waveform generation starting point and the complementary-waveform generation end point with a corresponding one of the complementary waveforms for connecting the complementary-waveform generation starting point to the complementary-waveform generation end point.

Furthermore, the complementary waveform generating unit may be configured, in the second output PCM data, to: extract the first connection point in the first output PCM data as the complementary-waveform generation starting point; extract a sample as the complementary-waveform generation end point, the sample (i) being subsequent to a sample later than the complementary-waveform generation starting point by the time T, (ii) being prior to a sample later than the complementary-waveform generation starting point by the time 2T, and (iii) having the smallest lean of the waveform in the PCM format; and replace each of the sections between the complementary-waveform generation starting point and the complementary-waveform generation end point with a corresponding one of the complementary waveforms for connecting the complementary-waveform generation starting point to the complementary-waveform generation end point.

In this manner, a value of the initial sample in the second output PCM data having the complementary waveform is replaced with a value of the last sample in the first output PCM data, thus enabling reduction in noise caused by a displacement from a position at which the connection points are to be connected, due to a waveform distortion.

Furthermore, the connection point extracting unit may be configured to calculate, in sections that respectively include an N-th sample, a (N+1)-th sample, and a (N+2)-th sample and that are included in each of the frames, (i) waveform variations each of which is a difference between sample values of adjacent samples and (ii) a waveform variation acceleration which is a difference between the waveform variations of the adjacent samples, and to extract, as the candidate connection point, the (N+2)-th sample in a corresponding one of the sections having a largest waveform variation acceleration, N being a natural number.

In this manner, the music playing apparatus can remove the transition portion as well as the silent portion with a less amount of data to be processed by detecting a high frequency component that has a distinctive feature and appears in a boundary between the transition portion and an end of the divided sound source, based on the waveform variation acceleration of the output PCM data.

Furthermore, the music playing apparatus may further include a gap removing unit configured to remove, in the first output PCM data, all samples subsequent to the first connection point detected by the end detecting unit, and to remove, in the second output PCM data, all samples prior to the second connection point detected by the end detecting unit. Here, the tune continuously-output unit may control the samples subsequent to the first connection point and the samples prior to the second connection point not to be outputted, without deleting the samples from a storage area of the music playing apparatus.

The music playing method according to the present invention is for obtaining and playing first output Pulse Code Modulation (PCM) data and second output PCM data generated, respectively, by dividing a sound source into portions, and coding and decoding each of the portions, the sound source being in a PCM format, wherein each of both ends of the first output PCM data and the second output PCM data includes: (i) a silent portion that is a section having an output level lower than a predetermined threshold; and (ii) a transition portion that connects a portion corresponding to an end of a corresponding one of the portions of the divided sound source to the silent portion, and the music playing method includes: determining whether or not each of frames respectively included in the first output PCM data and the second output PCM data is a sound frame including a sample having the output level not lower than the predetermined threshold; extracting a candidate connection point from each of one or more of the sound frames determined in the determining, the candidate connection point being a sample having a largest variation in a lean of a waveform in the PCM format; detecting, as a first connection point, a corresponding one of the candidate connection points included in a last sound frame of the first output PCM data, and detecting, as a second connection point, a corresponding one of the candidate connection points included in an initial sound frame of the second output PCM data, the last sound frame and the initial sound frame being included in the sound frames; and connecting the first output PCM data to the second output PCM data at the first connection point and the second connection point, and playing the connected data.

The program according to the present invention causes a computer to obtain and play first output Pulse Code Modulation (PCM) data and second output PCM data generated, respectively, by dividing a sound source into portions, and coding and decoding each of the portions, the sound source being in a PCM format, wherein each of both ends of the first output PCM data and the second output PCM data includes: (i) a silent portion that is a section having an output level lower than a predetermined threshold; and (ii) a transition portion that connects a portion corresponding to an end of a corresponding one of the portions of the divided sound source to the silent portion, and the program causes the computer to execute: determining whether or not each of frames respectively included in the first output PCM data and the second output PCM data is a sound frame including a sample having the output level not lower than the predetermined threshold; extracting a candidate connection point from each of one or more of the sound frames determined in the determining, the candidate connection point being a sample having a largest variation in a lean of a waveform in the PCM format; detecting, as a first connection point, a corresponding one of the candidate connection points included in a last sound frame of the first output PCM data, and detecting, as a second connection point, a corresponding one of the candidate connection points included in an initial sound frame of the second output PCM data, the last sound frame and the initial sound frame being included in the sound frames; and connecting the first output PCM data to the second output PCM data at the first connection point and the second connection point, and playing the connected data.

The integrated circuit according to the present invention obtains and plays first output Pulse Code Modulation (PCM) data and second output PCM data generated, respectively, by dividing a sound source into portions, and coding and decoding each of the portions, the sound source being in a PCM format, wherein each of both ends of the first output PCM data and the second output PCM data includes: (i) a silent portion that is a section having an output level lower than a predetermined threshold; and (ii) a transition portion that connects a portion corresponding to an end of a corresponding one of the portions of the divided sound source to the silent portion, and the integrated circuit includes: a sound and silence determining unit configured to determine whether or not each of frames respectively included in the first output PCM data and the second output PCM data is a sound frame including a sample having the output level not lower than the predetermined threshold; a connection point extracting unit configured to extract a candidate connection point from each of one or more of the sound frames determined by the sound and silence determining unit, the candidate connection point being a sample having a largest variation in a lean of a waveform in the PCM format; an end detecting unit configured to detect, as a first connection point, a corresponding one of the candidate connection points included in a last sound frame of the first output PCM data, and to detect, as a second connection point, a corresponding one of the candidate connection points included in an initial sound frame of the second output PCM data, the last sound frame and the initial sound frame being included in the sound frames; and a tune continuously-output unit configured to connect the first output PCM data to the second output PCM data at the first connection point and the second connection point, and to play the connected data.

The present invention can be implemented not only as a music playing apparatus, but also as an integrated circuit that implements the functions of the music playing apparatus, and as a program causing a computer to execute such functions. Obviously, such a program can be distributed through recording media, such as a CD-ROM, and transmission media, such as the Internet.

BRIEF DESCRIPTION OF DRAWINGS

FIG. 3A shows an example of gap removing information after a sound or silence determination process.

FIG. 3B shows an example of gap removing information after a connection point extracting process.

FIG. 3C shows an example of gap removing information after an end detecting process.

FIG. 4 shows a flowchart indicating processes of a gapless play by the music playing apparatus according to Embodiment 1 of the present invention.

NUMERICAL REFERENCES

Figure 1:
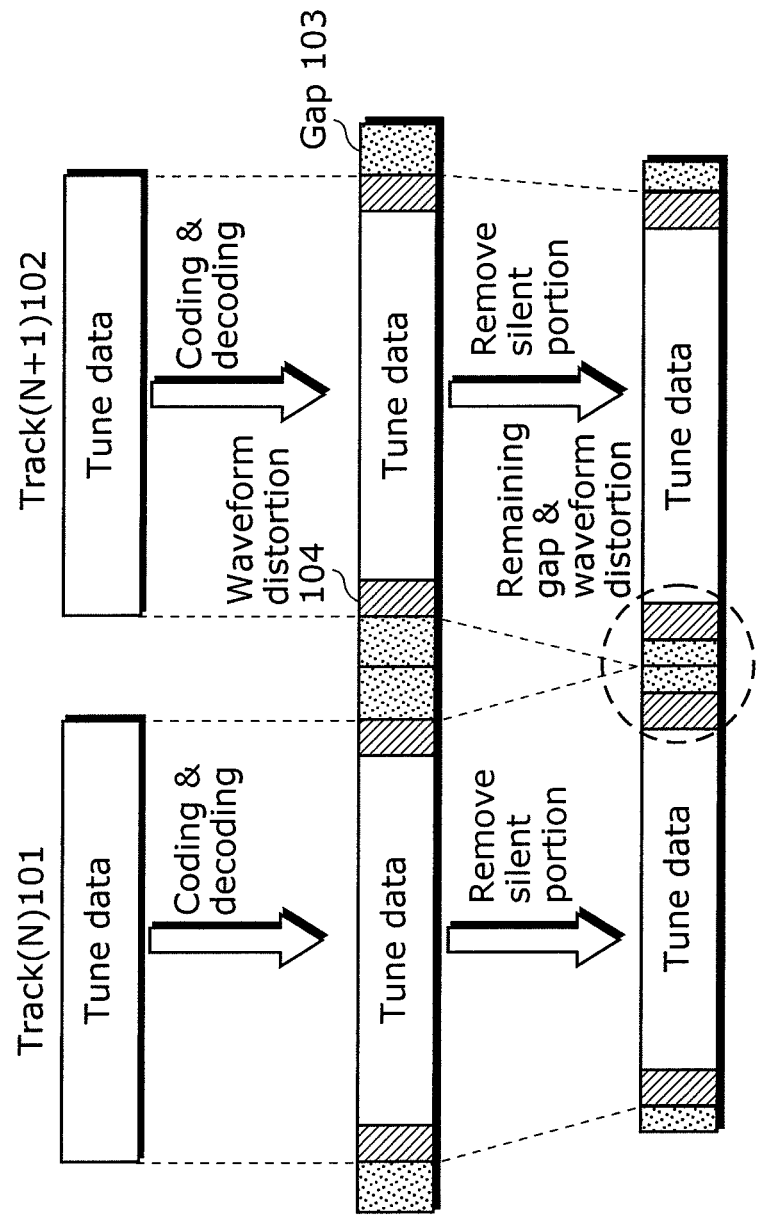
FIG. 1 schematically illustrates occurrence of gaps, and a problem of the conventional techniques.

101 Track (N)
102 Track (N+1)
103 Gap
104 Waveform distortion
200 Music playing apparatus
201 Play control unit
202 Tune storing unit
203 Decoding control unit
204 Output PCM storing unit
205 Gap information storing unit
206 Gap detecting unit 207 Gap removing unit
208 Complementary waveform generating unit
209 Tune continuously-output unit
210 Gap removing information
211 Sound and silence determining unit
212 Connection point extracting unit
213 End detecting unit
300 Frame number
301 Frame state
302 Sound starting position
303 Silence starting position
304 Frame information
601 Sample (N)
602 Sample (N+1)
603 Sample (N+2)
604 Waveform variation (N)
605 Waveform variation (N+1)
606 Waveform variation acceleration (N)
701 Complementary-waveform-generating section
702 Complementary-waveform generation starting point
703 Complementary-waveform generation end point
704 Waveform distortion
705 Complementary waveform
706 First connection point

BEST MODE FOR CARRYING OUT THE INVENTION

An embodiment of the present invention will be described with reference to drawings.

Embodiment 1

Figure 2:
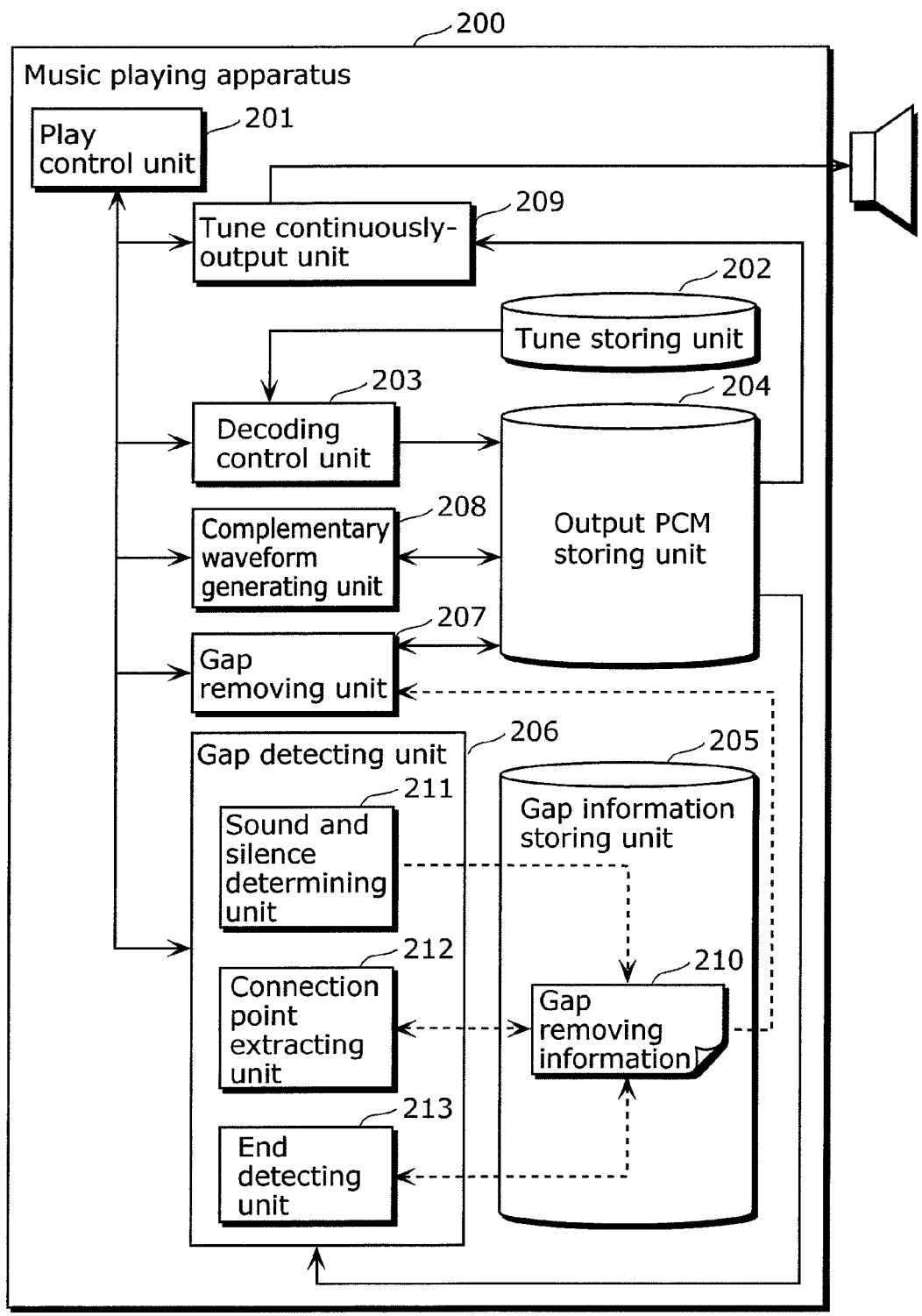
FIG. 2 illustrates a configuration of functional blocks of a music playing apparatus according to Embodiment 1 of the present invention.

FIG. 2 illustrates a configuration of functional blocks of a music playing apparatus 200 according to Embodiment 1 of the present invention. The music playing apparatus 200 is assumed to be, for example, a portable player capable of playing data using MP3, WMA, or AAC. The music playing apparatus 200 of Embodiment 1 includes a play control unit 201, a tune storing unit 202, a decoding control unit 203, an output PCM storing unit 204, a gap information storing unit 205, a gap detecting unit 206, a gap removing unit 207, a complementary waveform generating unit 208, and a tune continuously-output unit 209.

The play control unit 201 controls a normal play and the gapless play by controlling the decoding control unit 203, the gap detecting unit 206, the gap removing unit 207, the complementary waveform generating unit 208, and the tune continuously-output unit 209.

The tune storing unit 202 stores a plurality of coded data obtained by coding, using MP3, WMA, or AAC, respective tracks recorded onto a recording medium, such as a CD. The tune storing unit 202 may be a recording device, such as a nonvolatile memory, a hard disk, and a CD, or an internal memory area to which a tune is transferred from an external device. Furthermore, it is assumed that a plurality of tracks recorded onto the CD is obtained by dividing a sound source, such as live music, classical music, eurobeat, and other genres of music into portions, and the portions are continuously played as one continued tune data.

The decoding control unit 203 generates a plurality of output PCM data obtained by decoding a plurality of coded data stored by the tune storing unit 202, according to an instruction of the play control unit 201, and stores the plurality of output PCM data in the output PCM storing unit 204 on a frame-by-frame basis that is a processing unit defined by each audio coding technique. The front end of each output PCM data is referred to as a front end, and a terminal end of each output PCM data is referred to as a terminal end hereinafter. Furthermore, a combination of the front end and the terminal end is referred to as ends.

The output PCM storing unit 204 is a storage area for storing the output PCM data that is an output of the decoding control unit 203, and for storing a result of the output PCM data processed by the gap removing unit 207 and the complementary waveform generating unit 208. The output PCM storing unit 204 is assumed to be capable of buffering a frame having a gap equal to or longer than the longest gap to be added by a corresponding audio coding technique of the music playing apparatus 200, and to have a storage area having a dimension large enough to prevent the sound interruption caused by exhaustion of the buffer occurring when the tune continuously-output unit 209 outputs data.

The storage area of the music playing apparatus 200 may be tuned to the optimal size depending on each function, for example, by including a plurality of the output PCM storing units 204, and dividing the storage area into regions for (i) storing output of the decoding control unit 203 and (ii) storing processing results by the gap removing unit 207 and the complementary waveform generating unit 208.

The gap information storing unit 205 is a storage area for gap removing information 210, and stores the gap removing information 210 present in each frame, in tabular form as shown in FIGS. 3A to 3C. The gap removing information 210 in each frame corresponds to each frame information 304 in FIGS. 3A to 3C. Furthermore, frame numbers 300, frame states 301, sound starting positions 302, and silence starting positions 303 are stored as the gap removing information 210.

The storage area of the gap information storing unit 205 is assumed to have a dimension large enough to store the gap removing information 210 having a count of frames that can be stored in the output PCM storing unit 204. Since the sound starting positions 302 and the silence starting positions 303 are not simultaneously needed, the sound starting positions 302 and the silence starting positions 303 may be grouped, and managed with the frame states 301, respectively.

The gap detecting unit 206 registers or updates the gap removing information 210 in the gap information storing unit 205 for each of the frames, according to an instruction from the play control unit 201. More specifically, the gap detecting unit 206 includes a sound and silence determining unit 211, a connection point extracting unit 212, and an end detecting unit 213.

The sound and silence determining unit 211 determines whether each frame included in the output PCM data stored in the output PCM storing unit 204 is a sound frame or a silent frame. The properties of a corresponding coding algorithm are taken into accounts for determining whether a frame is the sound frame or silent frame, and the frames are analyzed based on a predetermined silence determination threshold (hereinafter simply referred to as threshold). Then, the sound and silence determining unit 211 registers the gap removing information 210 in the gap information storing unit 205.

FIG. 3A shows an example of the gap removing information 210 after processing by the sound and silence determining unit 211. The sound and silence determining unit 211 sets one of "sound" and "silence" to each of the frame states 301. Furthermore, the sound and silence determining unit 211 scans a frame to be processed from a front end of the frame, and stores (i) a sample initially appearing as a sample having a value not less than a threshold at the sound starting position 302, and (ii) a sample that has last transited from the value not less than the threshold to a value less than the threshold, at the silence starting position 303.

The connection point extracting unit 212 detects a boundary between a transition portion and a waveform corresponding to an end of one of portions divided by a sound source (in other words, "track"), and updates the sound starting position 302 or the silence starting position 303 included in the gap removing information 210, using the output PCM data stored in the output PCM storing unit 204 and the gap removing information 210 stored by the sound and silence determining unit 211 so that the transition portion can be removed. More specifically, the connection point extracting unit 212 extracts a sample having a largest variation in a lean of a waveform in the PCM format per frame, and determines the extracted samples as candidate connection points.

FIG. 3B shows an example of the gap removing information 210 processed by the connection point extracting unit 212. Bold frames around a sound starting position 302 and silence starting positions 303 show portions updated by the connection point extracting unit 212.

The end detecting unit 213 scans the gap information storing unit 205, and detects positions of front ends and terminal ends of frames after removing gaps. At the same time, the end detecting unit 213 detects a rising frame, a dropping frame, a risen frame, and a frame to be dropped, and updates the frame states 301 in the gap removing information 210. FIG. 3C shows an example of the gap removing information 210 processed by the end detecting unit 213. Bold frames around the frame states 301 show portions updated by the end detecting unit 213.

The gap removing unit 207 removes the gaps in ends of the output PCM data per sample, based on the gap removing information 210 obtained by the gap detecting unit 206 for each frame, according to an instruction from the play control unit 201. More specifically, the gap removing unit 207 removes all samples prior to a sound starting position in a rising frame, and all samples subsequent to a silence starting position in a dropping frame.

The complementary waveform generating unit 208 replaces, with a complementary waveform, a waveform distortion in an end of the output PCM data in which the gaps have been removed by the gap removing unit 207, according to an instruction from the play control unit 201.

The tune continuously-output unit 209 continuously outputs a plurality of the output PCM data stored by the output PCM storing unit 204 according to an instruction from the play control unit 201 so that a delay does not occur in the tune.

The operations of the music playing apparatus having such a configuration will be described in detail with reference to FIGS. 3A to 13B.

Figure 5A:
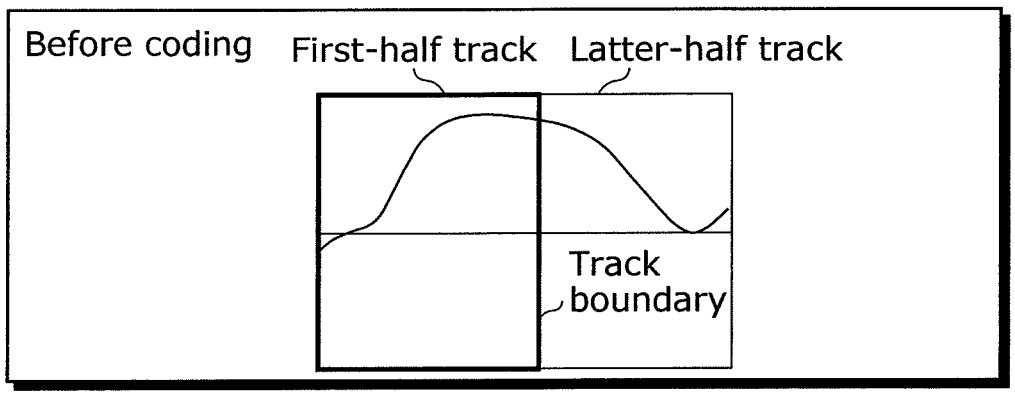
FIG. 5A illustrates a part of a waveform of tune data to be coded.
Figure 5B:
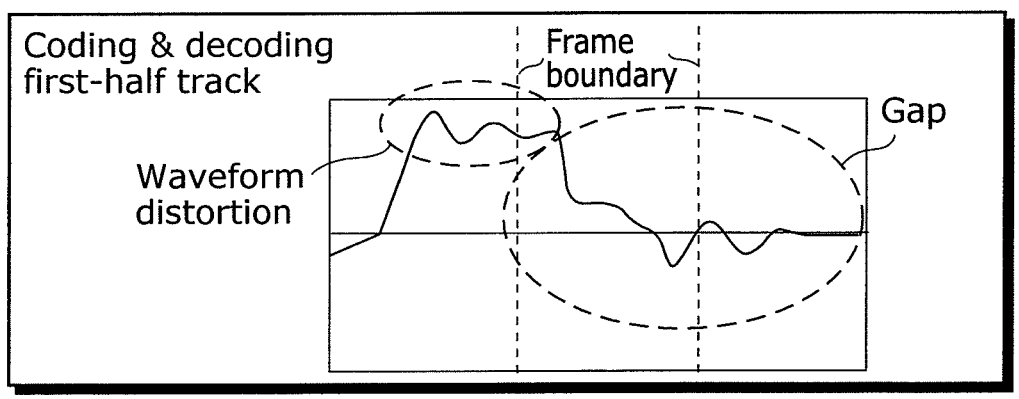
FIG. 5B illustrates a part of a waveform obtained by coding and decoding a first-half track.
Figure 6A:
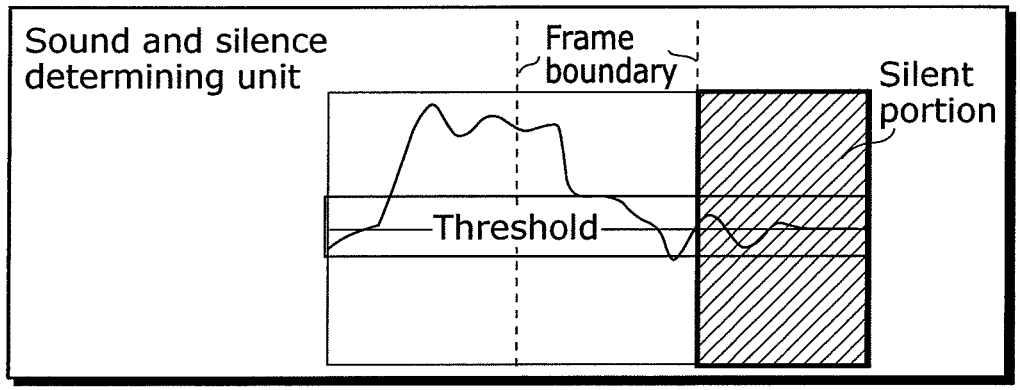
FIG. 6A shows a position of a silent portion determined in the sound or silence determination process.
Figure 6B:
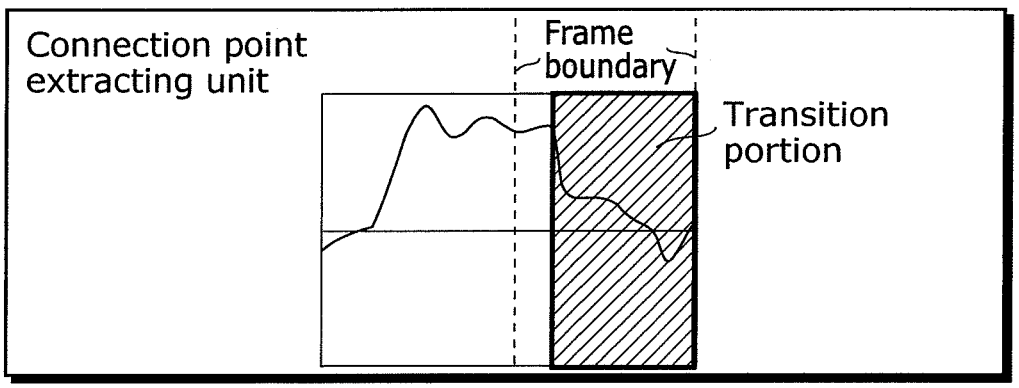
FIG. 6B shows a position of a transition portion extracted in the connection point extracting process.
Figure 6C:
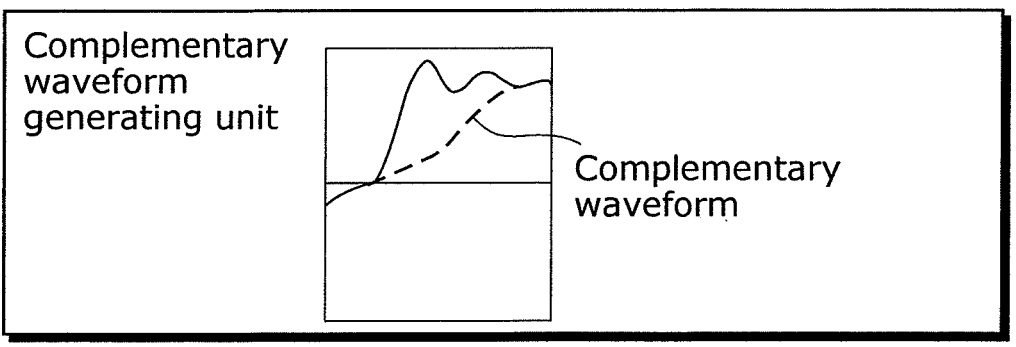
FIG. 6C shows a waveform before and after replacement with a complementary waveform in the complementary waveform generating process.

FIGS. 3A to 3C show the examples of the gap removing information 210 of each processing to be described later, namely, a state after a sound or silence determination process (FIG. 3A), a state after a candidate connection point extracting process (FIG. 3B), and a state after an end detecting process (FIG. 3C). FIG. 4 shows a flowchart indicating a procedure of the music playing apparatus 200 according to Embodiment 1. Furthermore, FIG. 5A illustrates a waveform around a track boundary of tune data (namely, sound source) to be divided into tracks. FIG. 5B illustrates a waveform around a terminal end of the first output PCM data obtained by coding and decoding a first-half track shown in FIG. 5A. Furthermore, FIGS. 6A to 6C show respective states after performing, on the first output PCM data in FIG. 5B, the sound or silence determination process (FIG. 6A), a connection point extracting process (FIG. 6B), and a complementary waveform generating process (FIG. 6C).

First, the sound source in the PCM format is divided into tracks (2 tracks, namely, the first-half track and a latter-half track in Embodiment 1) as illustrated in FIG. 5A, and the tracks are recorded on a recording medium such as a CD. Then, each track read from the recording medium is coded in a format, such as MP3, WMA, and AAC, and stored in the tune storing unit 202. Here, the coding of tracks may be performed by the music playing apparatus 200 and by other devices.

Upon detection of a request for playing a tune from the user, the play control unit 201 instructs the decoding control unit 203 to start decoding, in the music playing apparatus 200 according to Embodiment 1.

The decoding control unit 203 reads the data coded using one of MP3, WMA, and AAC from the tune storing unit 202, and decodes the read data. Then, the decoding control unit 203 stores the output PCM data resulting from the decoding, in the output PCM storing unit 204 (S10).

Here, the first-half track and the latter-half track are temporally successive 2 sections of the sound source. Furthermore, the output PCM data obtained by coding and decoding the first-half track is referred to as the first output PCM data, and the output PCM data obtained by coding and decoding the latter-half track is referred to as the second output PCM data, hereinafter.

Furthermore, the first output PCM data and the second output PCM data are collectively referred to as output PCM data. Furthermore, the output PCM data that is a subject of the present invention includes frames. Furthermore, each frame includes samples (1024 samples in Embodiment 1).

In such a case, the first output PCM data obtained by coding and decoding the first-half track is added with a gap including a silent portion and a transition portion as illustrated in FIG. 5B. Here, the silent portion is a section having an output level with a threshold less than a predetermined value. The transition portion is a section that connects a portion corresponding to a terminal end of tune data (namely, a first-half track) to be coded, to a silent portion. Furthermore, a predetermined section corresponding to a terminal end of a first-half track has a waveform distortion.

Since a larger absolute value is used as a value of a PCM sample in a terminal end in order to facilitate better understanding as an example, a significant waveform distortion occurs in coding and decoding processes, and gaps including a larger count of transition portions are added. Furthermore, although FIG. 5B only illustrates the terminal end of the first output PCM data, a gap is also added to the front end of the first output PCM data, and a waveform of the front end has a waveform distortion. Furthermore, although not illustrated, gaps are also added to a front end and a terminal end of the second output PCM data obtained by coding and decoding the latter-half track, and a waveform of the both ends has a waveform distortion.

Next, the play control unit 201 determines whether a gapless play mode is tuned on or off. In the case of off (No in S20), the play control unit 201 instructs the tune continuously-output unit 209 to output the decoded result as it is. The tune continuously-output unit 209 outputs the PCM data within the output PCM storing unit 204 according to the instruction.

In contrast, when the gapless play mode is tuned on (Yes in S20), the play control unit 201 instructs the gap detecting unit 206 to generate the gap removing information 210. The subsequent processes are performed per frame in accordance with a standard of each of the audio coding techniques (S20).

The gap detecting unit 206 instructed by the play control unit 201 first instructs the sound and silence determining unit 211 to perform the sound or silence determination process on a frame to be processed (S30). In the sound or silence determination process, for example, sample values of all samples included in a frame to be determined are compared with a predetermined threshold. When the frame includes a sample having a value not less than the threshold, the frame is determined to be a sound frame, and when all samples included in the frame have values less than the threshold, the frame is determined to be a silent frame.

Furthermore, during the process, the gap detecting unit 206 stores a sound starting position from which a sample having a value not less than the threshold initially appears, and a silence starting position indicating a position of a sample that has last transited from the value not less than the threshold to a value less than the threshold. Here, the sound or silence determination process is started not when the decoding control unit 203 entirely completes the decoding process (S10) but after the output PCM storing unit 204 stores the initial frame.

Then, in accordance with the format shown in FIG. 3A, the frame numbers 300, frame states 301, sound starting positions 302, and silence starting positions 303 are registered in the gap information storing unit 205 as the gap removing information 210. The sound and silence determining unit 211 performs the processes on all frames stored in the output PCM storing unit 204.

FIG. 6A schematically illustrates a waveform of the first output PCM data after performing the sound or silence determination process. Here, a portion having samples subsequent to a silence starting position in a frame that has been last determined to be a sound frame is determined as a silent portion that is to be removed (illustrated as a shaded area) (S30).

Next, the gap detecting unit 206 instructs the connection point extracting unit 212 to perform the candidate connection point extracting process for detecting a transition portion (S40). The connection point extracting unit 212 identifies a transition portion by detecting a high frequency component that has a distinctive feature and appears in a boundary between (i) a transition portion that is a common feature among the audio coding techniques, such as MP3, WMA, and AAC and (ii) ends of tune data (namely, tracks) to be coded.

Figure 7:
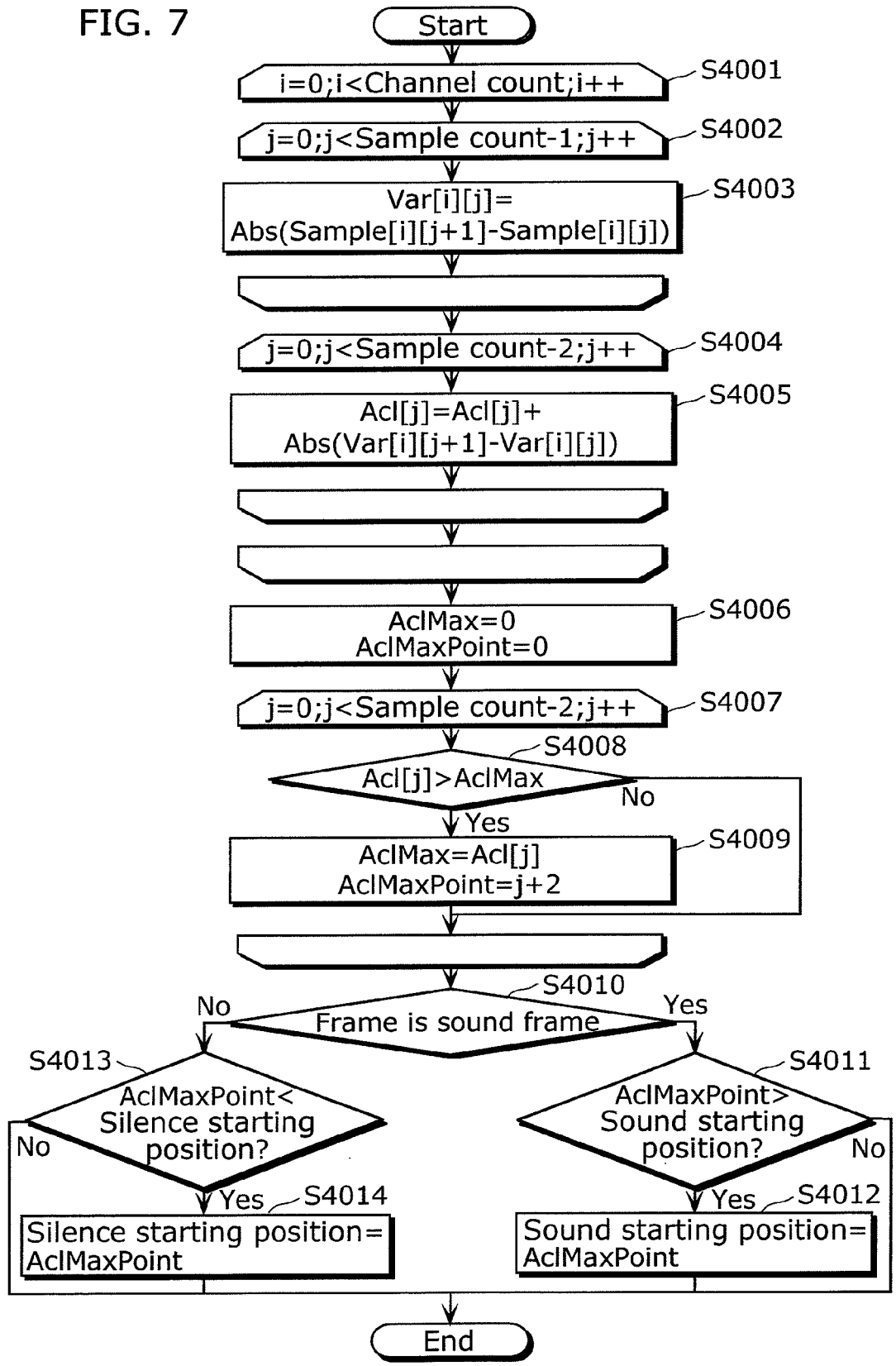
FIG. 7 shows a flowchart indicating an example of specific details of a candidate connection point extracting process.
Figure 8:
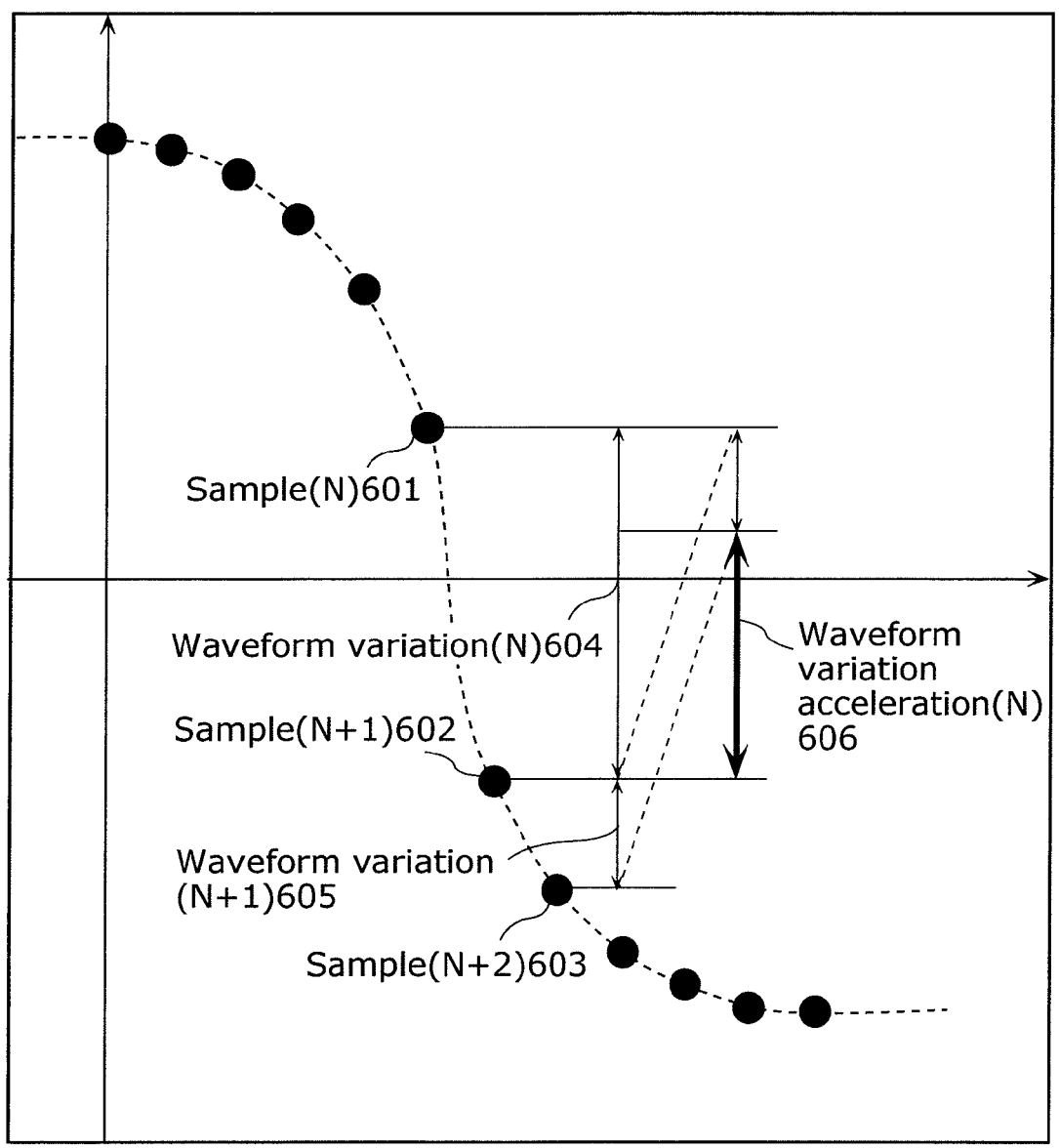
FIG. 8 illustrates an enlarged view of a waveform for describing the candidate connection point extracting process.

FIG. 7 shows a flowchart indicating specific details of the candidate connection point extracting process in FIG. 4 (S40). Furthermore, FIG. 8 illustrates an enlarged view of a waveform for describing the candidate connection point extracting process. The algorithm for the candidate connection point extracting process according to Embodiment 1 will be described with reference to FIGS. 7 and 8.

First, the sound source that is a subject of the present invention includes at least one channel (2 ch, 5.1 ch, and other channels). Then, the connection point extracting unit 212 calculates a waveform variation (expressed by Var[i][j]) that is an absolute value of a difference between sample values (expressed by Sample[i][j] and Sample[i][j+1]) of adjacent samples (a j-th sample and a (j+1)-th sample) of an i-th sample (S4003). Here, the connection point extracting unit 212 calculates waveform variations among all samples included in the frame (S4002).

In an example of FIG. 8, a waveform variation (N) 604 between a sample (N) 601 and a sample (N+1) 602, and a waveform variation (N+1) 605 between the sample (N+1) 602 and a sample (N+2) 603 fall into such a waveform variation.

Next, the connection point extracting unit 212 calculates a waveform variation acceleration (expressed by Acl[j]) that is an absolute value of a difference between the adjacent waveform variations (S4005). Here, the connection point extracting unit 212 calculates waveform variation accelerations among all of the waveform variations calculated in S4003 (S4004). In the example of FIG. 8, a waveform variation acceleration (N) 606 of a difference between the waveform variation (N) 604 and the waveform variation (N+1) 605 falls into such a waveform variation acceleration.

The connection point extracting unit 212 performs the aforementioned processes (S4002 to S4005) on all channels (S4001). In other words, the processes are repeated twice for 2 ch and 6 times for 5.1 ch. Furthermore, waveform variation accelerations corresponding to each channel are summed in S4005.

Next, the connection point extracting unit 212 resets a variable having a largest value of a waveform variation acceleration (AclMax) and a variable having a sample position (referred to as a candidate connection point) in a section having the largest value of the waveform variation acceleration (AclMaxPoint) (S4006), and searches for the largest value of a waveform variation acceleration (S4007 to S4009).

More specifically, the connection point extracting unit 212 compares all of the waveform variation accelerations (S4007) with the current largest value (AclMax) (S4008). When the connection point extracting unit 212 detects a larger waveform variation acceleration (Yes in S4008), it updates the variable (AclMax) to a value of the larger waveform variation acceleration, and stores the sample position in the variable (AclMaxPoint) (S4009).

As illustrated in FIG. 8, the waveform variation accelerations are calculated, using the sample values of 3 samples, namely, the sample (N) 601, the sample (N+1) 602, and the sample (N+2) 603. Then, the last sample in the section having the largest value of the waveform variation acceleration (namely, the sample (N+2) 603) is assumed to be a candidate connection point (AclMaxPoint). Such assumption is made because the waveform variation acceleration in the section probably becomes the largest one of all, after the samples are processed from the anterior to the posterior ones in order and the sample (N+2) 603 is newly added. In contrast, when the samples are processed from the posterior to the anterior ones in order, the candidate connection point (AclMaxPoint) may be the initial sample (the sample (N) 601 in the aforementioned example) in the section having the largest waveform variation acceleration.

When the largest value of the waveform variation acceleration (AclMax) and a candidate connection point (AclMaxPoint) are determined in the frame (S4007 to S4009), the connection point extracting unit 212 checks whether the frame is a sound frame or a silent frame with reference to the gap removing information 210 (S4010).

When the frame is a sound frame (Yes in S4010), the connection point extracting unit 212 compares the sample position having the largest waveform variation acceleration (AclMaxPoint) with the sound starting position 302 of the gap removing information 210 (S4011). Then, when a sample having the largest waveform variation acceleration is subsequent to the sound starting position 302 (Yes in S4011), as shown in FIG. 3B, the connection point extracting unit 212 updates the sound starting position 302 of the gap removing information 210 to a value of the candidate connection point (AclMaxPoint) (S4012).

In contrast, when the frame is a silent frame (No in S4010), the connection point extracting unit 212 compares the sample position having the largest waveform variation acceleration (AclMaxPoint) with the silence starting position 303 of the gap removing information 210 (S4013). Then, when a sample having the largest waveform variation acceleration is prior to the silence starting position 303 (Yes in S4013), as shown in FIG. 3B, the connection point extracting unit 212 updates the silence starting position 303 of the gap removing information 210 to a value of the candidate connection point (AclMaxPoint) (S4014).

Here, although the candidate connection point extracting process may be performed on all frames included in the first output PCM data, the process may be performed on only frames that have been determined as the sound frames in the sound or silence determination process. Such operation may reduce an amount of data to be processed.

FIG. 6B schematically illustrates a waveform of the first output PCM data after performing the candidate connection point extracting process. Here, a transition portion is located subsequent to a point having the largest waveform variation acceleration and is located around a terminal end from which a silent portion has been removed. Furthermore, the transition portion is to be removed (illustrated as a shaded area). Although the largest value of a waveform variation acceleration is used for identifying a portion having a high frequency component in Embodiment 1, another method for identifying the portion having the high frequency component may be used, using other algorithms such as an algorithm for determining a moving average and a moving weighted average of waveform variations, and by frequency-transforming the output PCM data.

Furthermore, since (i) the connection point extracting process is performed on all frames and thus the detected connection points are used as candidate connection points in Embodiment 1 and (ii) the sound starting positions 302 and the silence starting positions 303 are valid only in ends of frames, the connection point extracting process may be performed only on the ends of frames after performing the end detecting process to be described later (S50 in FIG. 4) to detect actual connection points (S40).

Figure 9:
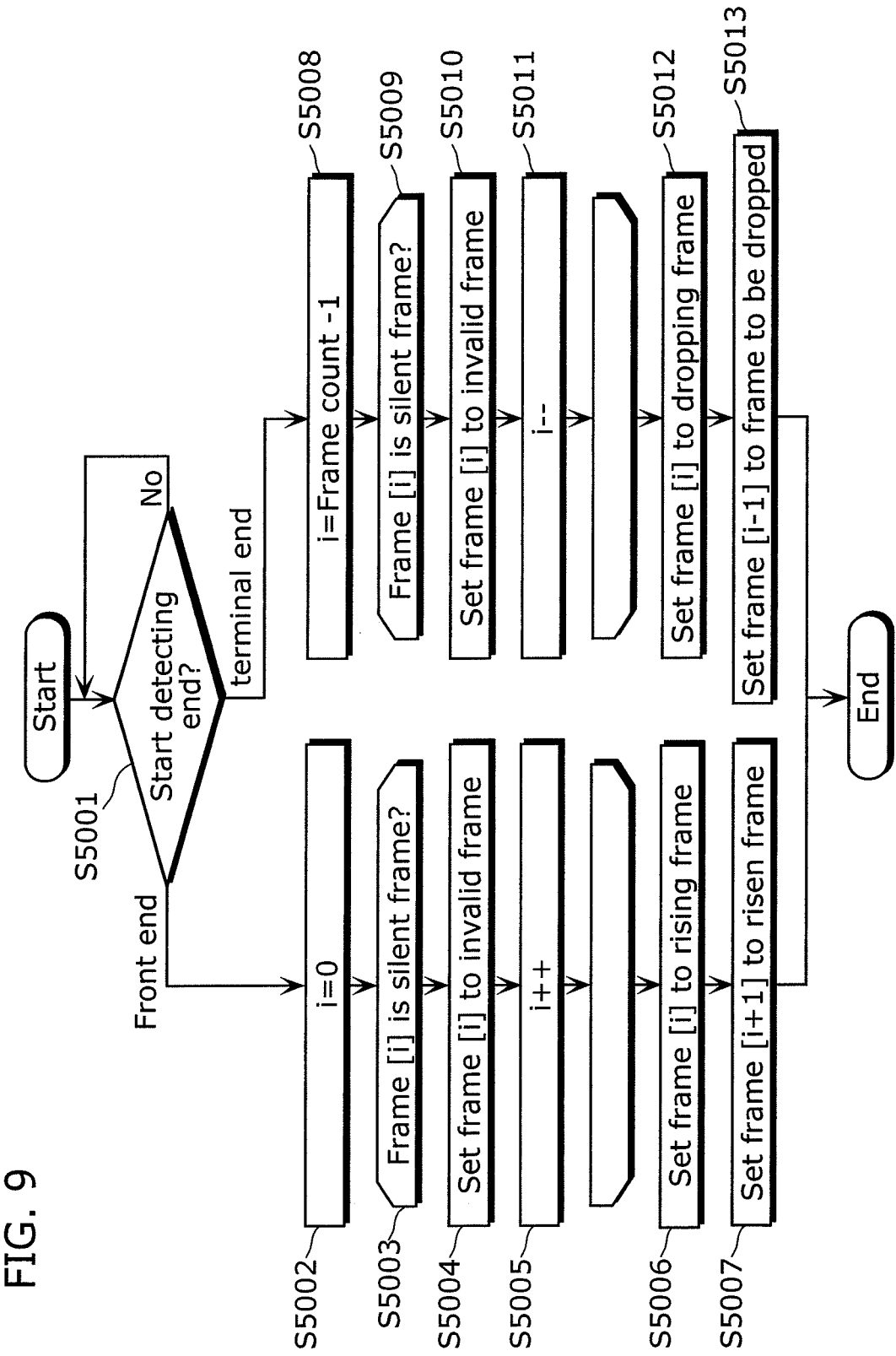
FIG. 9 shows a flowchart indicating an example of specific details of an end detecting process.

Next, the gap detecting unit 206 instructs the end detecting unit 213 to perform the end detecting process for detecting an end (S50). The end detecting unit 213 detects an end with reference to the output PCM data in the output PCM storing unit 204, and the corresponding gap removing information 210 in which the candidate connection point extracting process in S40 has been performed. FIG. 9 shows a flowchart indicating specific details of the end detecting process (S50) shown in FIG. 4.

First, the end detecting unit 213 monitors timing to start the end detecting process (S5001). For example, a predetermined count of frames from a front frame of the output PCM data is stored in the output PCM storing unit 204. Upon the sound or silence determination process performed on the frames, the end detecting unit 213 detects a front end of the output PCM data (S5002 to S5007). Here, the "predetermined count" may be the largest count of frames that can be stored in the output PCM storing unit 204, and any count of frames in which ends of frames will be empirically detected.

More specifically, the end detecting unit 213 sets a variable (i) representing the frame number 300 to a front frame (S5002), scans the gap removing information 210 in the gap information storing unit 205 in a state where the output PCM data is included in the output PCM storing unit 204, and refers to the frame states 301 in ascending order of the frame numbers 300 until a sound frame is detected (S5003).

When a referred frame is a silent frame, the end detecting unit 213 updates a corresponding one of the frame states 301 of the referred frame to "invalid" (S5004). Then, the end detecting unit 213 adds 1 to the variable (i) (S5005), and refers to the frame state 301 of the next frame.

Then, the end detecting unit 213 updates the frame state 301 of a frame that has been initially detected as a sound frame, to "rising" (S5006), and updates the frame state 301 of a frame immediately subsequent to the rising frame to "risen" (S5007). Furthermore, a candidate connection point of a rising frame in the second output PCM data is defined as the second connection point.

Here, the output PCM storing unit 204 should store a count of frames each having a gap equal to or longer than a length of a gap that can be added by an audio coding technique that conforms to the music playing apparatus 200. However, when no sound frame cannot be detected from all of the gap removing information 210 in the gap information storing unit 205, the end detecting unit 213 determines a frame having a largest one of the frame numbers 300 as a rising frame and all frames prior to the determined frame having the largest frame number 300 as invalid frames, and updates the frame states 301 corresponding to the invalid frames in the gap removing information 210. Then, the end detecting unit 213 determines a frame in which the decoding process and the sound or silence determination process have been performed as a risen frame. Such determination is made for preventing data having an infinitesimal sample value not more than a threshold of detecting silence originally included in an end of a sound source, from being excessively removed.

However, an invalid frame may continue to be set until a sound frame is detected, in consideration of a case where a gap having a length longer than assumed is added to a sound source because of coding data several times, as in the case where data coded using MP3 is decoded, the decoded data is again coded using WMA, and the coded data is played.

In contrast, in S5001, when the last frame of the output PCM data is stored in the output PCM storing unit 204 and the sound or silence determination process is performed on the frame, the end detecting process is performed on a terminal end of the output PCM data (S5008 to S5013). More specifically, the end detecting unit 213 sets a variable (i) representing the frame number 300 to the last frame (S5008), scans the gap removing information 210 in the gap information storing unit 205 in a state where the output PCM data is included in the output PCM storing unit 204, and refers to the frame states 301 in ascending order of the frame numbers 300 until a sound frame is detected (S5009). Here, the gap removing information 210 to be scanned may be entirely all information within the gap information storing unit 205, and have any count of information in which ends can be empirically detected from the gap removing information 210 corresponding to the frames.

When a referred frame is a silent frame, the end detecting unit 213 updates the frame state 301 of the referred frame to "invalid" (S5010). Then, the end detecting unit 213 subtracts 1 from the variable (i) (S5011), and refers to the frame state 301 of the previous frame.

Then, the end detecting unit 213 updates the frame state 301 of a frame that has been initially detected as a sound frame, to a dropping frame (S5012), and updates the frame state 301 of a frame immediately previous to the dropping frame, to "to be dropped" (S5013). Furthermore, a candidate connection point of the dropping frame in the first output PCM data is defined as the first connection point.

Here, similarly to the process on a front end of output PCM data, when no sound frame can be detected from the gap removing information 210 to be scanned, in the gap information storing unit 205, (i) a frame having a smallest one of the frame numbers 300 is defined as a frame to be dropped, (ii) a frame one frame subsequent to the frame to be dropped is defined as a dropping frame, and (iii) frames subsequent to the dropping frame are all defined as invalid frames.

Here, the gap removing information 210 to be scanned is desirably the entire content of the gap information storing unit 205 in consideration of a case where a gap having a length longer than assumed is added to a sound source because of coding data several times, as in the case where data coded using MP3 is decoded, the decoded data is again coded using WMA, and the coded data is played.

The aforementioned processes are performed on 2 portions, namely a front end and a terminal end, respectively, in each of the first output PCM data and the second output PCM data. Then, as a result of the processes, the end detecting unit 213 updates the frame states 301 of the gap removing information 210 that correspond to the frames to be processed as shown in FIG. 3C (S50).

Here, FIG. 9 shows an example of searching for a sound frame from a front frame to the subsequent frames, and determining the sound frame that has been initially detected as a rising frame as well as searching for a sound frame from the last frame to frames prior to the last frame, and determining the sound frame that has been initially detected as a dropping frame. However, independent of the aforementioned method, for example, the output PCM data may be searched from the front frame to the subsequent frames, and the sound frame that has been initially detected may be determined as a rising frame, and the sound frame that has been detected last may be determined as a dropping frame.

Figure 10:
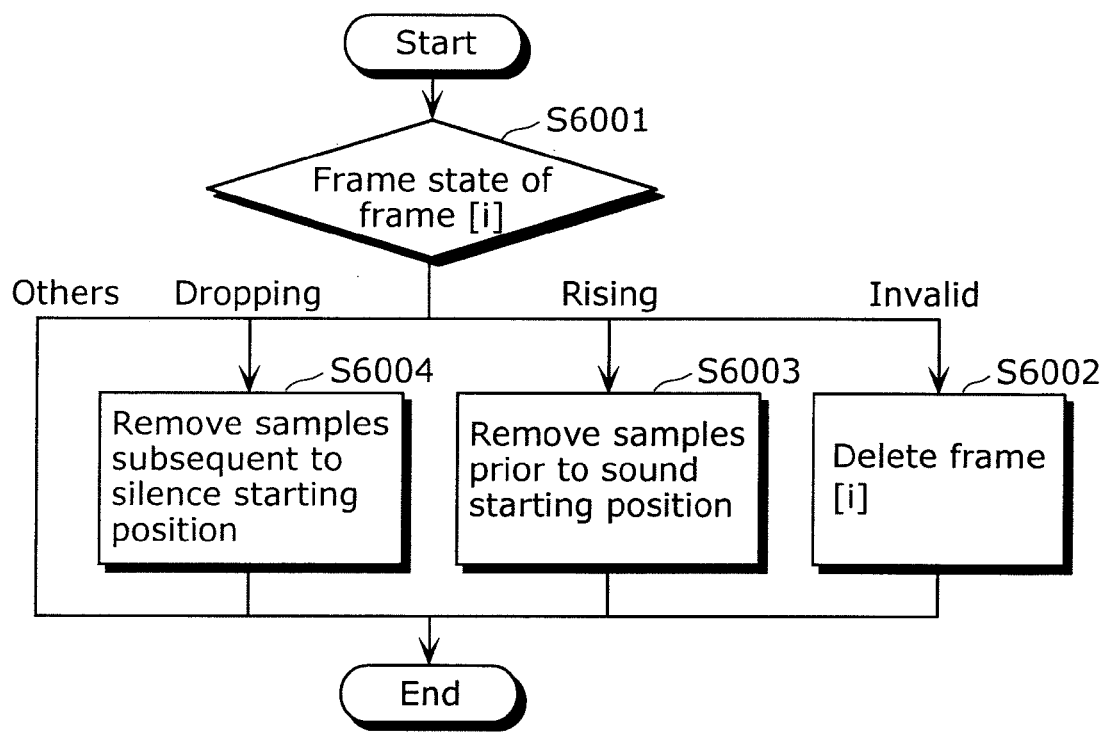
FIG. 10 shows a flowchart indicating an example of specific details of a gap removing process.

Next, the play control unit 201 instructs the gap removing unit 207 to perform a gap removing process (S60). The gap removing unit 207 removes a gap in the output PCM storing unit 204 on a per sample unit basis, based on the gap removing information 210. FIG. 10 shows a flowchart indicating specific details of the gap removing process (S60) shown in FIG. 4.

First, the gap removing unit 207 checks the frame state 301 of a frame to be determined (frame [i]) with reference to the gap removing information 210 (S6001). Then, when the frame state 301 is invalid, the gap removing unit 207 deletes the frame [i] from the output PCM storing unit 204, and the frame information 304 of the frame [i] from the gap removing information 210 (S6002). Here, the invalid frame is a part of a silent portion, and thus, deleting all invalid frames leads to removing the silent portions in the ends of frames.

When the frame state 301 of the frame [i] is rising, the gap removing unit 207 removes all samples prior to the sound starting position 302 of the frame [i] (S6003). Here, a sample in a boundary between a front end and a transition portion of the output PCM data is set in the sound starting position 302 of the rising frame in the candidate connection point extracting process (S40 in FIG. 4). Thus, the transition portion in the front end of the output PCM data is removed by the process.

When the frame state 301 of the frame [i] is dropping, the gap removing unit 207 removes all samples subsequent to the silence starting position 303 of the frame [i] (S6004). Here, a sample in a boundary between a terminal end and a transition portion of the output PCM data is set in the silence starting position 303 of a dropping frame in the candidate connection point extracting process (S40 in FIG. 4). Thus, the transition portion of the terminal end of the output PCM data is removed by the process.

In contrast, when the frame state 301 of the frame [i] does not fall into none of the cases (frames between the rising frame and the dropping frame), the gap removing unit 207 ends the processes without performing any particular process on the frame [i]. The gap removing unit 207 removes gaps that have been added to ends of the output PCM data by repeating the processes on all frames.

Although the output PCM data in which the gaps have been removed is written back to the output PCM storing unit 204, the output PCM data after removing the gaps may be stored in another storage region before the subsequent processes are performed. Furthermore, although such process is performed after the end detecting process S50 in Embodiment 1, the process may be performed after the complementary waveform generating process in S80.

Furthermore, the gap removing unit 207 may instruct the tune continuously-output unit 209 through the play control unit 201 not to directly remove data in the output PCM storing unit 204 but to avoid outputting a gap (S60).

Figure 11:
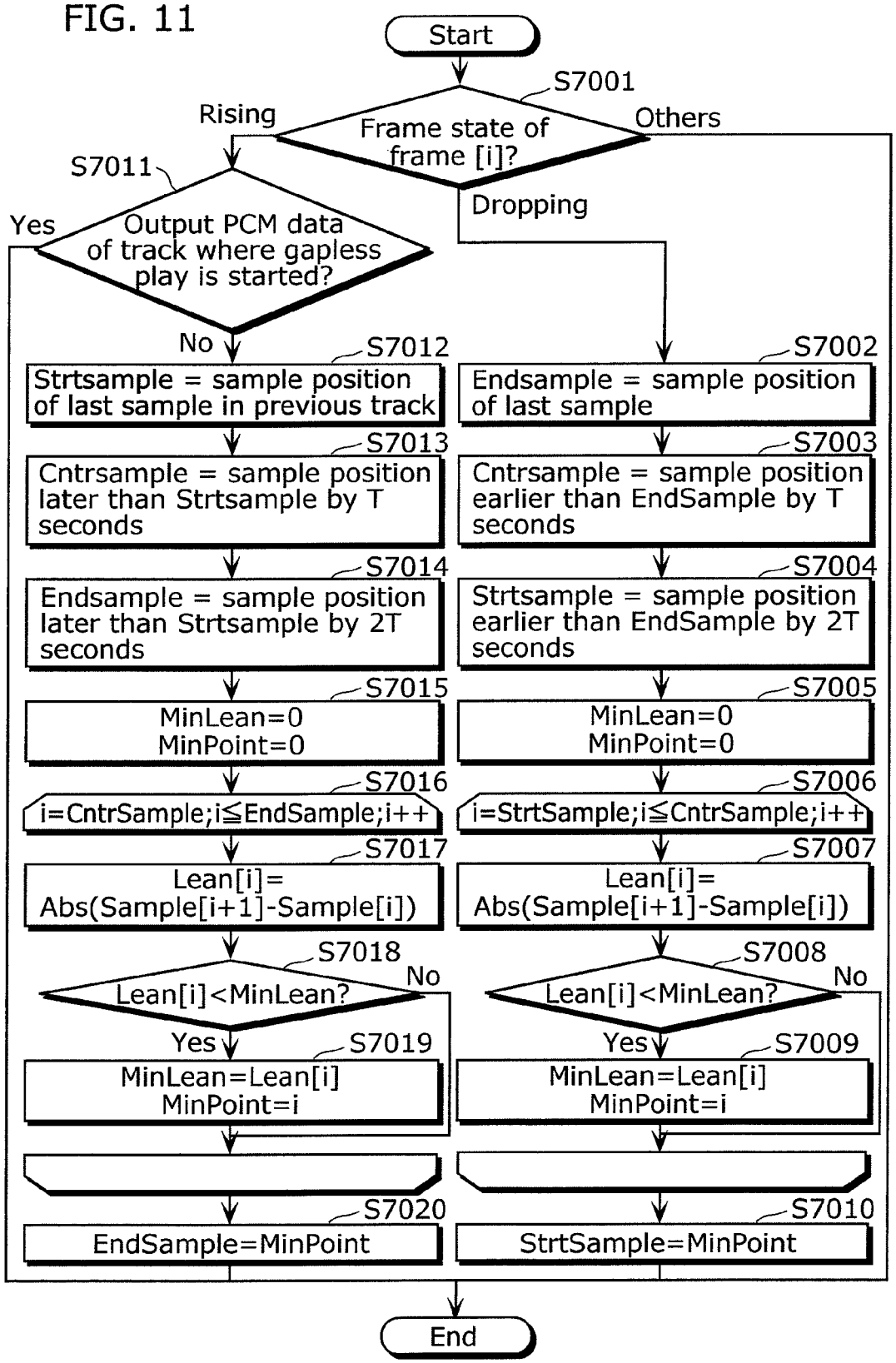
FIG. 11 shows a flowchart indicating an example of specific details of a complementary-waveform-generating section determining process.
Figure 12:
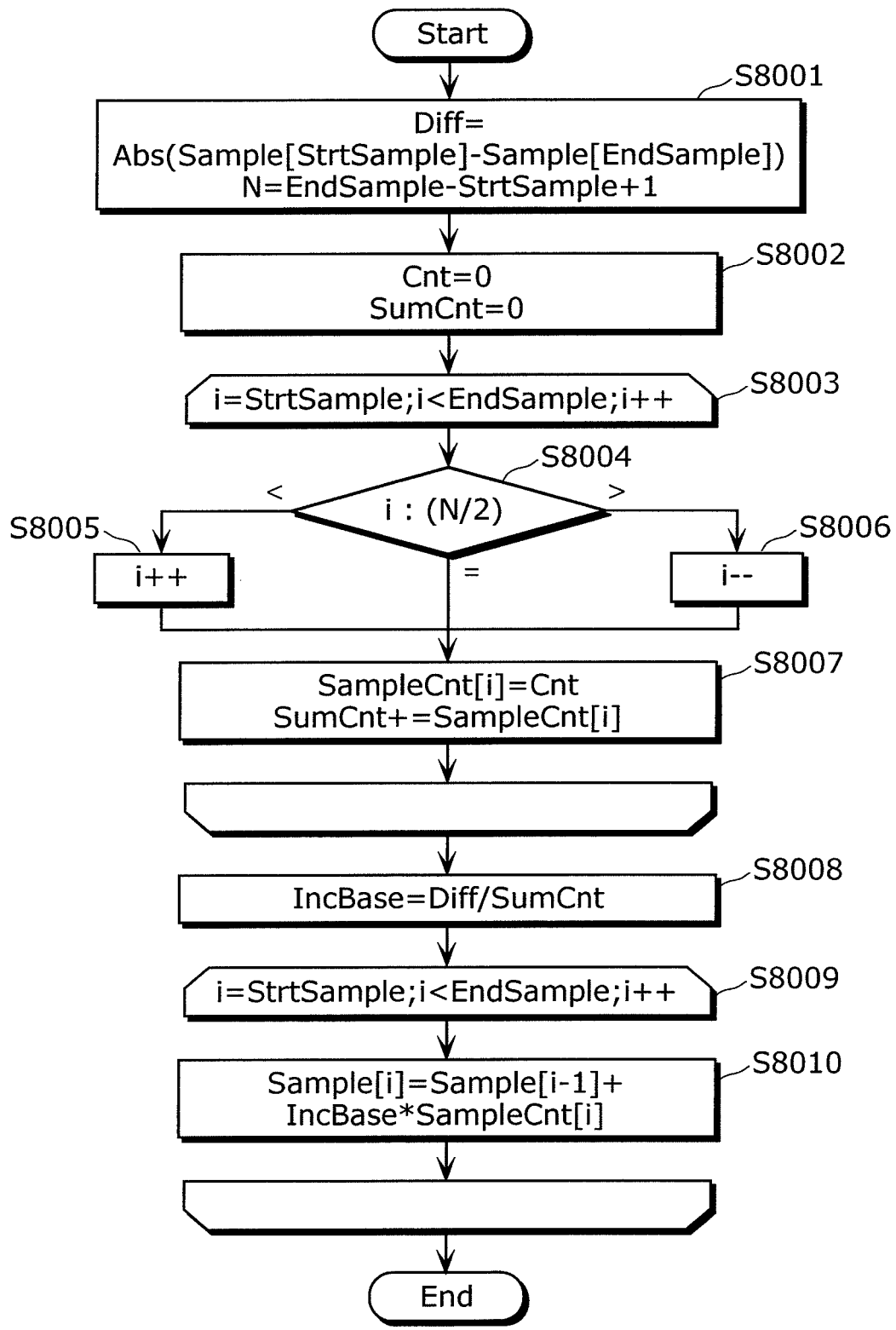
FIG. 12 shows a flowchart indicating an example of specific details of a complementary waveform generating process.
Figure 13A:
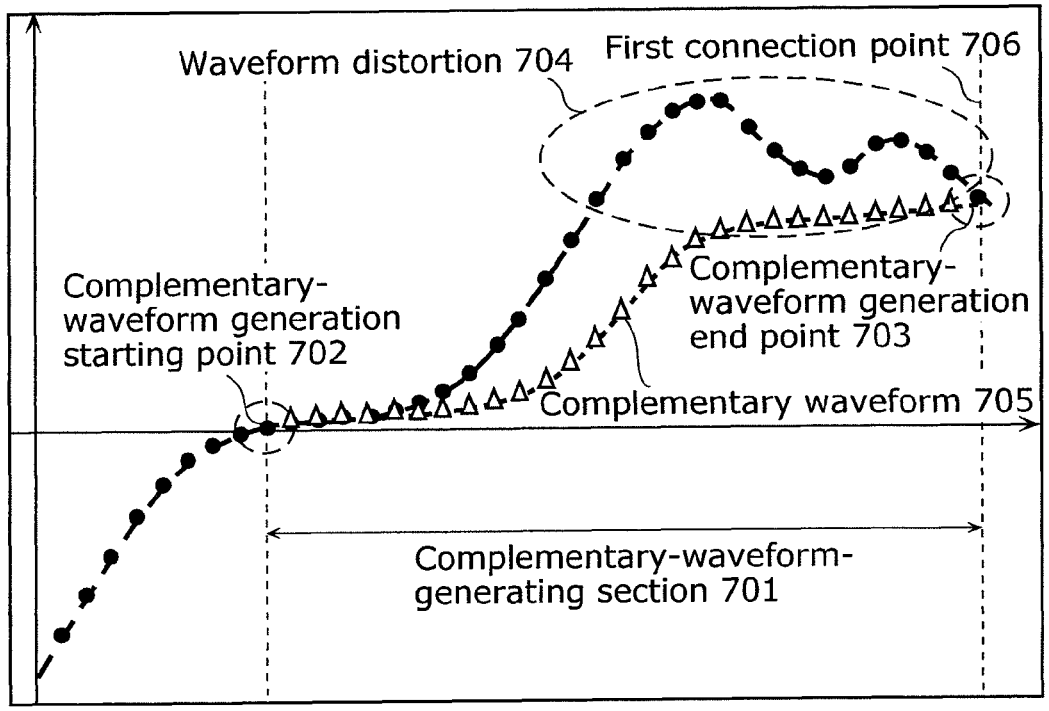
FIG. 13A shows an enlarged view of a terminal end of a first-half track for describing the complementary waveform generating process.
Figure 13B:
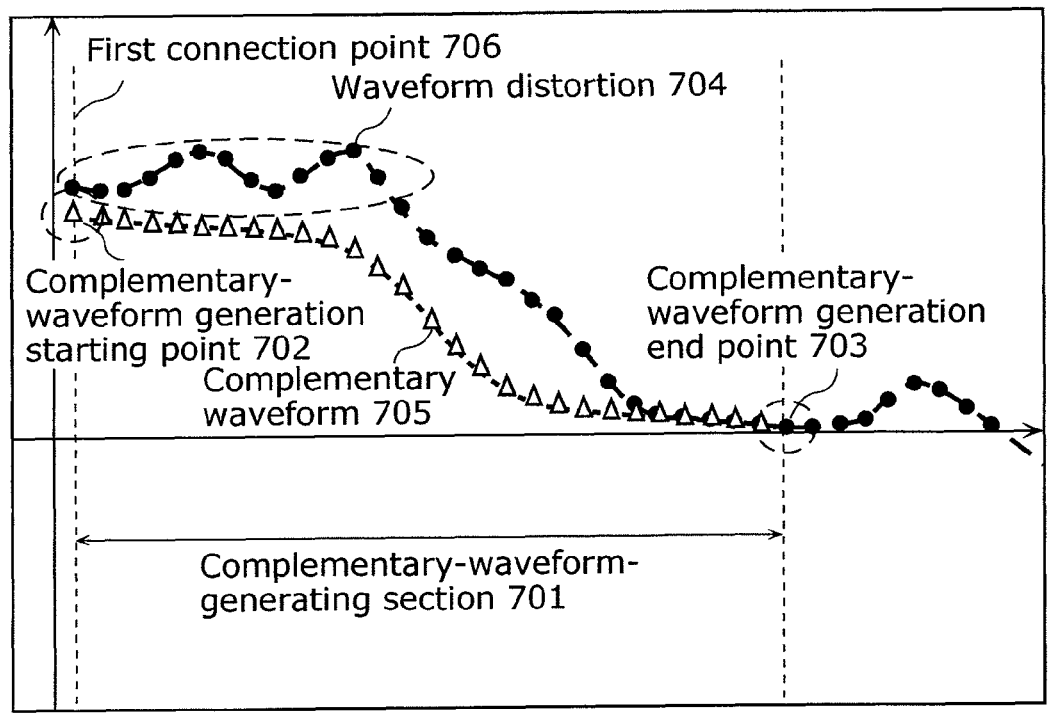
FIG. 13B shows an enlarged view of a front end of a latter-half track for describing the complementary waveform generating process.

Next, the play control unit 201 instructs the complementary waveform generating unit 208 to perform a complementary-waveform-generating section determining process (S70) and the complementary waveform generating process (S80). FIG. 11 shows a flowchart indicating specific details of the complementary-waveform-generating section determining process (S70) shown in FIG. 4. FIG. 12 shows a flowchart indicating specific details of the complementary waveform generating process (S80) shown in FIG. 4. FIG. 13A shows an enlarged view of a terminal end of the first output PCM data. FIG. 13B shows an enlarged view of a front end of the second output PCM data.

First, the complementary waveform generating unit 208 checks the frame state 301 of the frame [i] with reference to the gap removing information 210 (S7001). When the frame state 301 falls into neither a rising frame nor a dropping frame (others in S7001), the complementary waveform generating unit 208 ends the complementary-waveform-generating section determining process.

When the frame state 301 of the frame [i] is dropping (dropping in S7001), the complementary waveform generating unit 208 determines a complementary-waveform generation starting point (StrtSample) and a complementary-waveform generation end point (EndSample) in a terminal end of the output PCM data (S7001 to S7010). Here, the processes are performed, for example, when a complementary-waveform-generating section is determined in the terminal end of the first output PCM data as illustrated in FIG. 13A.

First, the complementary waveform generating unit 208 sets a sample position (first connection point) of the last sample in the first output PCM data to a complementary-waveform generation end point (EndSample) (S7002). Furthermore, the complementary waveform generating unit 208 sets a sample earlier than the complementary-waveform generation end point by a time T as a sample to be searched (CntrSample) (S7003). Furthermore, the complementary waveform generating unit 208 sets a sample earlier than the complementary-waveform generation end point by a time 2T as a temporary complementary-waveform generation starting point (StrtSample) (S7004). Here, the time T is a duration longer than a duration of each section having a waveform distortion, for example, 0.5 millisecond. In other words, a section between a sample to be searched and the complementary-waveform generation end point has a waveform distortion.

Next, the complementary waveform generating unit 208 determines an actual complementary-waveform generation starting point from a section between the temporary complementary-waveform generation starting point and the sample to be searched (S7005 to S7010). The actual complementary-waveform generation starting point is assumed to be a sample having the smallest lean of a waveform in the section.

First, the complementary waveform generating unit 208 resets a variable (MinLean) having the minimum value of a lean of a waveform, and a variable (MinPoint) having a sample position of a sample having the smallest lean of a waveform (S7005).

Next, the complementary waveform generating unit 208 calculates a lean (Lean[i]) that is an absolute value of a difference between sample values of adjacent samples (S7007). Then, the complementary waveform generating unit 208 compares the lean (Lean[i]) calculated in S7007 with the current minimum value (MinLean) of the lean (S7008). When the lean calculated in S7007 is smaller than the current minimum value (Yes in S7008), the complementary waveform generating unit 208 stores a sample position of a sample having the smallest lean of a waveform in MinPoint as well as updating the minimum value of the lean.

Here, the complementary waveform generating unit 208 repeatedly performs the aforementioned processes (S7007 to S7009) on all samples included in StrtSample to CntrSample (S7006). After the processes, the complementary waveform generating unit 208 sets the sample position (MinPoint) of the sample having the smallest lean of waveform to the complementary-waveform generation starting point (StrtSample) (S7010). Thereby, the complementary-waveform-generating section (StrtSample to EndSample) is determined in a terminal end of the first output PCM data.

When the frame state 301 of the frame [i] is rising (rising in S7001), the complementary waveform generating unit 208 determines whether or not the output PCM data is output PCM data of a track where the gapless play is started (S7011). When the output PCM data is the output PCM data of the track where the gapless play is started (Yes in S7011), the complementary waveform generating unit 208 ends the complementary-waveform-generating section determining process. Switching the gapless play mode to a "On" mode during the processes means that no gap is removed and no complementary waveform is generated in the previous output PCM data. Thus, even when a complementary waveform is generated in a front end of the output PCM data, sound interruption and prolonged sound cannot be removed between the current output PCM data and the previous output PCM data.

In contrast, when the gapless play mode has already been turned on prior to the processes on the output PCM data (No in S7011), the complementary waveform generating unit 208 determines the complementary-waveform generation starting point (StrtSample) and the complementary-waveform generation end point (EndSample) in a front end of the output PCM data (S7012 to S7020). Here, the processes are performed, for example, when a complementary-waveform-generating section is determined in a front end of the second output PCM data as illustrated in FIG. 13B.

First, the complementary waveform generating unit 208 sets a sample position (first connection point) of the last sample in the first output PCM data as a complementary-waveform generation starting point (StrtSample) (S7012). Here, the initial sample (second connection point) of the second output PCM data may be used as the complementary-waveform generation starting point in S7012. However, when a difference between a sample value of the first connection point and a sample value of the second connection point is larger, the first connection point and the second connection point cannot be smoothly connected, causing the user to hear sound skips, for example.

Next, the complementary waveform generating unit 208 sets a sample later than the complementary-waveform generation starting point by the time T as a sample to be searched (CntrSample) (S7013). Furthermore, the complementary waveform generating unit 208 sets a sample later than the complementary-waveform generation starting point by the time 2T as a temporary complementary-waveform generation end point (EndSample) (S7014). In other words, a section between the sample to be searched and the complementary-waveform generation starting point has a waveform distortion.

Next, the complementary waveform generating unit 208 determines an actual complementary-waveform generation end point from the section between the temporary complementary-waveform generation end point and the sample to be searched (S7015 to S7020). The actual complementary-waveform generation end point is assumed to indicate a sample position of a sample having the smallest lean of a waveform in the section.

Then, the complementary waveform generating unit 208 resets a variable (MinLean) having the minimum value of a lean of a waveform and a variable (MinPoint) having a sample position of a sample having the smallest lean of a waveform (S7015).

Next, the complementary waveform generating unit 208 calculates a lean (expressed by Lean[i]) that is an absolute value of a difference between sample values of adjacent samples (S7017). Then, the complementary waveform generating unit 208 compares the lean (Lean[i]) calculated in S7017 with the current minimum value (MinLean) of the lean (S7018). When the lean calculated in S7017 is smaller than the current minimum value (Yes in S7018), the complementary waveform generating unit 208 stores a sample position of a sample having the smallest lean of a waveform in MinPoint as well as updating the minimum value of the lean.

Here, the complementary waveform generating unit 208 repeatedly performs the aforementioned processes (S7017 to S7019) on all samples included in CntrSample to EndSample (S7016). After the processes, the complementary waveform generating unit 208 sets the sample position (MinPoint) of the sample having the smallest lean of the waveform to the complementary-waveform generation end point (EndSample) (S7020). Thereby, the complementary-waveform-generating section (StrtSample to EndSample) is determined in a front end of the second output PCM data.

In Embodiment 1, a cubic curve having a larger lean as the curve approaches the center of the complementary-waveform-generating section is used as a complementary waveform 705 illustrated in FIGS. 13A and 13B. Thus, the complementary waveform 705 needs to be connected to the original waveform of a track in a position having a moderate lean so that the waveforms are smoothly connected while preventing abnormal noise from occurring.

Accordingly, the complementary waveform generating unit 208 detects a portion that has a smaller difference between sample values of adjacent samples and that is distant respectively from the first and second connection points by a sample minute (the time T) during which a region including a waveform distortion 704 can be avoided, and determines the complementary-waveform-generating section 701. Thus, as illustrated in FIG. 13A, a section between the complementary-waveform generation starting point 702 and the complementary-waveform generation end point 703 (first connection point 706) is determined as the complementary-waveform-generating section 701 in a dropping frame. In contrast, as illustrated in FIG. 13B, a section between the complementary-waveform generation starting point 702 (first connection point 706) and the complementary-waveform generation end point 703 is determined as the complementary-waveform-generating section 701 in a rising frame.

As a result of the gap removing process (S60), probably there are cases where a sample count is less than a count necessary for determining the complementary-waveform-generating section 701 in a rising frame or a dropping frame. In such a case, the complementary-waveform-generating section 701 may be determined and the complementary waveform generating process (S80) to be described later may be performed, by connecting adjacent frames to each other, such as connecting a rising frame to a risen frame, and a dropping frame to a frame to be dropped (S70).

Next, the complementary waveform generating unit 208 generates the complementary waveform 705 based on the complementary-waveform-generating section 701 determined in the complementary waveform generating section determining process (S70).

First, as shown in FIG. 12, the complementary waveform generating unit 208 calculates (i) a difference (Diff) between sample values of the complementary-waveform generation starting point (StrtSample) and the complementary-waveform generation end point (EndSample) and (ii) a sample count (N) included in the complementary-waveform-generating section (S8001), and resets variables (Cnt, SumCnt) (S8002).

Next, the complementary waveform generating unit 208 determines a weighting factor (SampleCnt[i]) for determining a lean of the complementary waveform (S8003 to S8007). More specifically, when a sample position of a sample [i] is prior to a position of N/2 (i<N/2), 1 is added to Cnt (S8005). When the sample position of the sample [i] is subsequent to the position of N/2 (i>N/2), 1 is subtracted from Cnt (S8006). When the sample position of the sample matches the position of N/2 (i=N/2), Cnt is not changed. Cnt calculated in such a manner is set to a weighting factor SampleCnt[i] (S8007). At the same time, a sum (SumCnt) of weighting factors SampleCnt[i] is determined.

As a result of the processes, when the sample count (N) in the complementary-waveform-generating section is an odd number, the weighting factors become SampleCnt[i]=1, 2, 3, ..., k−1, k, k−1, ..., 3, 2, 1. In contrast, when the sample count (N) in the complementary-waveform-generating section is an even number, the weighting factors become SampleCnt[i]=1, 2, 3, ..., k−1, k−1, ..., 3, 2, 1.

Next, the complementary waveform generating unit 208 calculates an increase (IncBase) in sample values per weighting factor (S8008). More specifically, the difference (Diff) between the sample values in the complementary-waveform-generating section may be divided by the sum of weighting factors (SumCnt).

Next, the complementary waveform generating unit 208 updates a sample value of each sample in the complementary-waveform-generating section, using a corresponding one of the weighting factors (SampleCnt[i]) and a corresponding one of the increases (IncBase) in the sample values per weighting factor (S8009 to S8010). In other words, a value multiplied by both variables of SampleCnt[i] and IncBase is added to a sample value (Sample [i−1]) of a sample that is one sample prior to the current sample. Thereby, a lean of the complementary waveform becomes smaller in both ends each of which has a smaller weighting factor. In contrast, the lean becomes larger in the center, having a larger weighting factor, of the complementary-waveform-generating section.

The aforementioned processes are performed, such that a waveform of a terminal end of the first output PCM data and a front end of the second output PCM data become respectively as shown in FIGS. 13A and 13B.

The complementary waveform 705 in the dropping frame passes, in the complementary-waveform-generating section 701 determined in the complementary-waveform-generating section determining process (S70), through (i) the complementary-waveform generation starting point 702 that is a starting point and (ii) the complementary-waveform generation end point 703 that is an end point, as shown in FIG. 13A.

Furthermore, the complementary waveform 705 is a cubic curve that has a larger lean as it approaches the center of the two points 702 and 703. Such a waveform is used as a complementary waveform for removing (i) an uncomfortable feeling that is caused by a waveform distortion and (ii) a high frequency component that is a main cause for noise. Here, when the complementary waveform generating process is performed on a terminal end of the first output PCM data, the sample value of the first connection point 706 that has been stored is used for performing the complementary waveform generating process on a front end of the second output PCM data.

The complementary waveform 705 in a rising frame passes through (i) the complementary-waveform generation starting point 702 that is a starting point of the complementary-waveform-generating section 701 and (ii) the complementary-waveform generation end point 703 that is the end point of the complementary-waveform-generating section 701, as shown in FIG. 13B. Furthermore, the complementary waveform 705 is a cubic curve that has a larger lean as it approaches the center of the two points 702 and 703.

However, the complementary waveform generating process performed on the front end of the second output PCM data differs from the complementary waveform generating process performed on the first output PCM data in that a sample value of the first connection point 706 stored in a previous process is used as a sample value of the complementary-waveform generation starting point 702. Such difference makes it possible to smoothly connect the first output PCM data to the second output PCM data. Furthermore, the gapless play performed between tracks in which ends are edited and between different tunes can bring an additional advantage of reducing noise felt by the user.

In contrast, the complementary waveform generating process can be performed on a front end of the second output PCM data using the second connection point as a complementary-waveform generation starting point. However, there are cases where a difference between a sample value of the first connection point and a sample value of the second connection point is larger due to an influence of a waveform distortion and others. In such a case, the first output PCM data cannot smoothly be connected to the second output PCM data using the second connection point as a complementary-waveform generation starting point, causing the user to hear sound skips, for example.

Then, the complementary waveform generating unit 208 overwrites the generated complementary waveform 705 on the output PCM storing unit 204. FIG. 6C schematically shows a PCM waveform after performing the overwriting process, and a broken line shows the complementary waveform. Here, depending on a limit of hardware resources of the music playing apparatus 200, the complementary-waveform-generating section determining process in S70 and the complementary waveform generating process in S80 do not have to be performed. In such a case, the complementary waveform generating unit 208 may be excluded from the configuration illustrated in FIG. 2 (S80).

Next, the play control unit 201 instructs the tune continuously-output unit 209 to output the output PCM data. The tune continuously-output unit 209 continuously outputs the dropping frames of the first output PCM data and the rising frames of the second output PCM data that are processed up to S80, without any interval between the first output PCM data and the second output PCM data (in other words, outputs the first output PCM data and the second output PCM data by connecting them at the first and second connection points). Such a process makes it possible to perform the gapless play (S90).

According to the aforementioned configuration, it is possible to provide the music playing apparatus 200 (i) which removes a silent portion even when tracks are read from a recording medium in which a sound source divided into the tracks is recorded and the tracks are individually coded and decoded by an audio coding technique, such as MP3, WMA, and AAC, and the decoded tracks are continuously played and (ii) which removes a transition portion and replaces a waveform distortion with a complementary waveform so as to perform the gapless play with high-quality sound for the user, compared to the conventional techniques.

Although Embodiment 1 describes a case where a sound source is divided into 2 tracks, the present invention is not limited to such, and is applicable to a case where tune data is obtained from a CD on which a sound source is recorded by dividing the sound source into 3 or more tracks. In such a case, first, the aforementioned processes are performed on the premise that the output PCM data corresponding to the first track is the first output PCM data and the output PCM data corresponding to the second track is the second output PCM data. Then, the same processes should be performed on the premise that the output PCM data corresponding to the second track is the first output PCM data and the output PCM data corresponding to the third track is the second output PCM data.

Furthermore, the play control unit 201, the tune storing unit 202, the decoding control unit 203, then output PCM storing unit 204, the gap information storing unit 205, the gap detecting unit 206, the gap removing unit 207, the complementary waveform generating unit 208, and the tune continuously-output unit 209 may be a program on a software, or a medium recording the program for implementing the music playing apparatus 200 of Embodiment 1.

Although each functional block included in the music playing apparatus 200 is typically implemented by a Central Processing Unit (CPU) or a program operated on an information device that needs a memory, a part or all of the functions may be configured from a single System-Large-Scale Integration (LSI). The LSIs may be made as separate individual chips, or as a single chip to include a part or all thereof. The LSI is mentioned but there are instances where, due to a difference in the degree of integration, an Integrated Circuit (IC), a System-LSI, a super LSI, and an ultra LSI are used.

Furthermore, the means for circuit integration is not limited to an LSI, and implementation with a dedicated circuit or a general-purpose processor is also available. It is also acceptable to use a field programmable gate array (FPGA) that is programmable after the LSI has been manufactured, and a reconfigurable processor in which connections and settings of circuit cells within the LSI are reconfigurable.

Furthermore, when integrated circuit technology that replaces LSIs appears through progress in the semiconductor technology or other derived technology, that technology can naturally be used to integrate the functional blocks. Biotechnology is anticipated to be applied to the integrated circuit technology.

INDUSTRIAL APPLICABILITY

The music playing apparatus according to the present invention has a function of removing a transition portion and a complementary function for a waveform distortion that are not taken into account in the conventional techniques, and is useful as a music playing apparatus that implements the gapless play with high-quality sound without any uncomfortable feeling in terms of the sense of hearing.

The invention claimed is:

1. A music playing apparatus that obtains first output Pulse Code Modulation (PCM) data and second output PCM data that are successive and that plays the first output PCM data and the second output PCM data in this order, the first output PCM data and the second output PCM data being generated by dividing a sound source into portions, and coding and decoding each of the portions, the sound source being in a PCM format,
wherein each of both ends of the first output PCM data and the second output PCM data includes: (i) a silent portion that is a section having an output level lower than a predetermined threshold; and (ii) a transition portion that connects a portion corresponding to an end of a corresponding one of the portions of the divided sound source to the silent portion, and
said music playing apparatus comprises:
a sound and silence determiner configured to determine whether or not each of frames respectively included in the first output PCM data and the second output PCM data is a sound frame including a sample having an output level not lower than the predetermined threshold;
a connection point extractor configured to extract a candidate connection point from each of one or more of the sound frames determined by said sound and silence determiner, the candidate connection point being a sample having a largest variation in a lean of a waveform in the PCM format;
an end detector configured to identify a boundary between a terminal end of the first output PCM data and the transition portion subsequent to the first output PCM data by setting, as a first connection point, a corresponding one of the candidate connection points included in a last sound frame of the first output PCM data, and to identify a boundary between a front end of the second output PCM data and the transition portion prior to the second output PCM data by setting, as a second connection point, a corresponding one of the candidate connection points included in an initial sound frame of the second output PCM data, the last sound frame and the initial sound frame being included in the sound frames, the terminal end and the front end being included in the ends of the portions; and
a tune outputter configured to connect the first output PCM data to the second output PCM data at the first connection point and the second connection point, and to play the connected data.

2. The music playing apparatus according to claim 1, wherein each of the first output PCM data and the second output PCM data has a waveform distortion, in a waveform of each of sections corresponding to the ends of the portions of the divided sound source, due to the dividing, coding, and decoding of the sound source, and
said music playing apparatus further comprises
a complementary waveform generator configured to replace the waveforms in the sections each having the waveform distortion, respectively with complementary waveforms each of which is a cubic curve and has a larger lean as approaching a center of a corresponding one of the sections.

3. The music playing apparatus according to claim 2, wherein said complementary waveform generator is configured to:
previously hold a value of a time T longer than a duration of each of the sections having the waveform distortions;

extract a sample in the first output PCM data as a complementary-waveform generation starting point, the sample (i) being subsequent to a sample earlier than the first connection point by a time 2T, (ii) being prior to a sample earlier than the first connection point by a time T, and (iii) having a smallest lean of a waveform in the PCM format;

extract the first connection point as a complementary-waveform generation end point; and replace each of the sections between the complementary-waveform generation starting point and the complementary-waveform generation end point with a corresponding one of the complementary waveforms for connecting the complementary-waveform generation starting point to the complementary-waveform generation end point.

4. The music playing apparatus according to claim 3, wherein said complementary waveform generator is configured, in the second output PCM data, to:

extract the first connection point in the first output PCM data as the complementary-waveform generation starting point;

extract a sample as the complementary-waveform generation end point, the sample (i) being subsequent to a sample later than the complementary-waveform generation starting point by the time T, (ii) being prior to a sample later than the complementary-waveform generation starting point by the time 2T, and (iii) having the smallest lean of the waveform in the PCM format; and replace each of the sections between the complementary-waveform generation starting point and the complementary-waveform generation end point with a corresponding one of the complementary waveforms for connecting the complementary-waveform generation starting point to the complementary-waveform generation end point.

5. The music playing apparatus according to claim 1, wherein said connection point extractor is configured to calculate, in sections that respectively include an N-th sample, a (N+1)-th sample, and a (N+2)-th sample and that are included in each of the frames, (i) waveform variations each of which is a difference between sample values of adjacent samples and (ii) a waveform variation acceleration which is a difference between the waveform variations of the adjacent samples, and to extract, as the candidate connection point, the (N+2)-th sample in a corresponding one of the sections having a largest waveform variation acceleration, N being a natural number.

6. The music playing apparatus according to claim 1, further comprising a gap remover configured to remove, in the first output PCM data, all samples subsequent to the first connection point detected by said end detector, and to remove, in the second output PCM data, all samples prior to the second connection point detected by said end detector.

7. A music playing method for obtaining first output Pulse Code Modulation (PCM) data and second output PCM data that are successive and for playing the first output PCM data and the second output PCM data in this order, the first output PCM data and the second output PCM data being generated by dividing a sound source into portions, and coding and decoding each of the portions, the sound source being in a PCM format, wherein each of both ends of the first output PCM data and the second output PCM data includes: (i) a silent portion that is a section having an output level lower than a predetermined threshold; and (ii) a transition portion that connects a portion corresponding to an end of a corresponding one of the portions of the divided sound source to the silent portion, and the music playing method comprises:

determining whether or not each of frames respectively included in the first output PCM data and the second output PCM data is a sound frame including a sample having an output level not lower than the predetermined threshold;

extracting a candidate connection point from each of one or more of the sound frames determined in the determining, the candidate connection point being a sample having a largest variation in a lean of a waveform in the PCM format;

identifying a boundary between a terminal end of the first output PCM data and the transition portion subsequent to the first output PCM data by setting, as a first connection point, a corresponding one of the candidate connection points included in a last sound frame of the first output PCM data, and identifying a boundary between a front end of the second output PCM data and the transition portion prior to the second output PCM data by setting, as a second connection point, a corresponding one of the candidate connection points included in an initial sound frame of the second output PCM data, the last sound frame and the initial sound frame being included in the sound frames; and connecting the first output PCM data to the second output PCM data at the first connection point and the second connection point, and playing the connected data.

8. A non-transitory computer-readable recording medium on which a program is recorded, the program causing a computer to obtain first output Pulse Code Modulation (PCM) data and second output PCM data that are successive and to play the first output PCM data and the second output PCM data in this order, the first output PCM data and the second output PCM data being generated by dividing a sound source into portions, and coding and decoding the portions, the sound source being in a PCM format, wherein each of both ends of the first output PCM data and the second output PCM data includes: (i) a silent portion that is a section having an output level lower than a predetermined threshold; and (ii) a transition portion that connects a portion corresponding to an end of a corresponding one of the portions of the divided sound source to the silent portion, and the program causing the computer to execute:

determining whether or not each of frames respectively included in the first output PCM data and the second output PCM data is a sound frame including a sample having an output level not lower than the predetermined threshold;

extracting a candidate connection point from each of one or more of the sound frames determined in the determining, the candidate connection point being a sample having a largest variation in a lean of a waveform in the PCM format;

identifying a boundary between a terminal end of the first output PCM data and the transition portion subsequent to the first output PCM data by setting, as a first connection point, a corresponding one of the candidate connection points included in a last sound frame of the first output PCM data, and identifying a boundary between a front end of the second output PCM data and the transition portion prior to the second output PCM data by setting, as a second connection point, a corresponding one of the candidate connection points included in an initial sound frame of the second output PCM data, the last sound frame and the initial sound frame being included in the sound frames, the terminal end and the front end being included in the ends of the portions; and connecting the first output PCM data to the second output PCM data at the first connection point and the second connection point, and playing the connected data.

9. An integrated circuit for obtaining first output Pulse Code Modulation (PCM) data and second output PCM data that are successive and for playing the first output PCM data and the second output PCM data in this order, the first output PCM data and the second output PCM data being generated by dividing a sound source into portions, and coding and decoding the portions, the sound source being in a PCM format, wherein each of both ends of the first output PCM data and the second output PCM data includes: (i) a silent portion that is a section having an output level lower than a predetermined threshold; and (ii) a transition portion that connects a portion corresponding to an end of a corresponding one of the portions of the divided sound source to the silent portion, and said integrated circuit comprises:

a sound and silence determiner configured to determine whether or not each of frames respectively included in the first output PCM data and the second output PCM data is a sound frame including a sample having an output level not lower than the predetermined threshold;

a connection point extractor configured to extract a candidate connection point from each of one or more of the sound frames determined by said sound and silence determiner, the candidate connection point being a sample having a largest variation in a lean of a waveform in the PCM format;

an end detector configured to identify a boundary between a terminal end of the first output PCM data and the transition portion subsequent to the first output PCM data by setting, as a first connection point, a corresponding one of the candidate connection points included in a last sound frame of the first output PCM data, and to identify a boundary between a front end of the second output PCM data and the transition portion prior to the second output PCM data by setting, as a second connection point, a corresponding one of the candidate connection points included in an initial sound frame of the second output PCM data, the last sound frame and the initial sound frame being included in the sound frames; and a tune outputter configured to connect the first output PCM data to the second output PCM data at the first connection point and the second connection point, and to play the connected data.

* * * * *